US011347681B2

(12) United States Patent
Kumar et al.

(10) Patent No.: US 11,347,681 B2
(45) Date of Patent: May 31, 2022

(54) ENHANCED READING OR RECALLING OF ARCHIVED FILES

(71) Applicant: EMC IP Holding Company LLC, Hopkinton, MA (US)

(72) Inventors: Shiv Kumar, Pune (IN); Jai Gahlot, Pune (IN); Avadut Mungre, North Goa (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 88 days.

(21) Appl. No.: 16/776,926

(22) Filed: Jan. 30, 2020

(65) Prior Publication Data
US 2021/0240657 A1 Aug. 5, 2021

(51) Int. Cl.
G06F 16/11 (2019.01)
G06F 16/13 (2019.01)
G06F 16/16 (2019.01)
G06F 11/14 (2006.01)
G06F 16/17 (2019.01)

(52) U.S. Cl.
CPC ........ G06F 16/113 (2019.01); G06F 11/1451 (2013.01); G06F 11/1461 (2013.01); G06F 11/1464 (2013.01); G06F 16/137 (2019.01); G06F 16/164 (2019.01); G06F 16/1734 (2019.01); G06F 2201/83 (2013.01)

(58) Field of Classification Search
CPC .. G06F 16/113; G06F 16/137; G06F 16/1734; G06F 11/1464; G06F 16/164; G06F 11/1461; G06F 11/1451; G06F 2201/83; G06F 16/185; G06F 16/11; G06F 3/0647; G06F 16/119; G06F 11/1453
See application file for complete search history.

(56) References Cited

U.S. PATENT DOCUMENTS

| | | | | |
|---|---|---|---|---|
| 6,959,368 B1 * | 10/2005 | St. Pierre | ............ | G06F 11/1448 711/100 |
| 7,685,177 B1 * | 3/2010 | Hagerstrom | ........ | G06F 16/1744 707/999.204 |
| 8,315,986 B1 * | 11/2012 | Kapoor | ............... | G06F 11/1464 707/679 |
| 8,595,243 B1 * | 11/2013 | Gunda | ................ | G06F 16/1748 707/755 |
| 9,002,800 B1 * | 4/2015 | Yueh | ................... | G06F 11/1448 707/661 |

(Continued)

Primary Examiner — David T. Brooks
(74) Attorney, Agent, or Firm — Amin, Turocy & Watson, LLP

(57) ABSTRACT

Files can be managed to mitigate undesirable reading of files from secondary storage component (SSC) associated with a storage system comprising primary storage component (PSC). File management component (FMC) can determine file identifiers for files stored in SSC and store them in reference files associated with such files. FMC can determine file identifiers for files stored in PSC and store them in a file entry data store. In response to a client request, FMC can determine whether a local file stored in PSC is a copy of an archived file stored in SSC based on whether the respective file identifiers of the archived file and local file or snapshot of the local file match. If there is a suitable match, FMC can read the snapshot of the local file and provide it to client device; if not, FMC can read the archived file and provide it to client device.

20 Claims, 10 Drawing Sheets

(56) References Cited

U.S. PATENT DOCUMENTS

| | | | | |
|---|---|---|---|---|
| 9,946,729 B1* | 4/2018 | Stacey | .................. | G06F 16/185 |
| 2003/0018878 A1* | 1/2003 | Dorward | ............... | G06F 16/137 |
| | | | | 711/216 |
| 2007/0260643 A1* | 11/2007 | Borden | ................. | G06F 16/137 |
| 2008/0028007 A1* | 1/2008 | Ishii | .................... | G06F 11/1451 |
| 2008/0256019 A1* | 10/2008 | Alpern | ................... | G06F 16/14 |
| 2011/0099148 A1* | 4/2011 | Bruning, III | ........ | G06F 11/1004 |
| | | | | 707/639 |
| 2012/0246271 A1* | 9/2012 | Takata | ................ | G06F 16/1748 |
| | | | | 709/217 |
| 2014/0074790 A1* | 3/2014 | Berman | ............. | G06F 11/1448 |
| | | | | 707/649 |
| 2014/0149476 A1* | 5/2014 | Kishimoto | .......... | G06F 16/1748 |
| | | | | 707/827 |
| 2014/0188957 A1* | 7/2014 | Hosoi | .................... | G06F 16/10 |
| | | | | 707/829 |
| 2019/0220528 A1* | 7/2019 | Cruciani | ............... | G06F 16/174 |

* cited by examiner

ENHANCED READING OR RECALLING OF ARCHIVED FILES

TECHNICAL FIELD

This disclosure relates generally to processing, communicating, and storing information, e.g., to enhanced reading or recalling of archived files.

BACKGROUND

A storage platform can be employed to store data. The storage platform can employ an operating system (e.g., a file system) and can serve as a file server. The file system typically can be employed to maintain files (e.g., electronic files), comprising data (e.g., electronic or digital data), including keeping track of the locations of files and associated data in memory to enable accessing of the files stored in, and retrieval of the files from, the memory of the storage platform. The files, including data associated with the files, often can be processed in a number of ways when data is being written to or read from files and when the files are being stored in, or retrieved from, the memory. Files can be stored in a local data storage of the storage platform or can be stored in an archive data storage of or associated with the storage platform. The archive data storage can be accessed via a communication connection and/or communication network to facilitate accessing or retrieving (e.g., reading or recalling) files stored in the archive data storage.

Clients can utilize client devices to communicate with the storage platform to request files (e.g., read files), request creation of new files, request writing to files, or request other desired processing of files (e.g., data stored in files), wherein the files may be stored in the local data store or the archive data storage. The storage platform can service the requests from the client devices by accessing the desired files, performing desired operations on the file, and/or providing the desired files to the client devices.

The above-described description is merely intended to provide a contextual overview regarding processing, communication, and storage of information, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise determining, by a system comprising a processor, a file identifier associated with a file based at least in part on file data of the file and a defined hash function. The method also can comprise storing, by the system, the file identifier in a reference file associated with the file, wherein the reference file is stored in a primary data store. The method further can comprise storing, by the system, the file in an archive data store that is remote from the primary data store, wherein, in response to a request for the file stored in the archive data store, the file identifier is usable to determine whether a copy of the file is stored on the primary data store to mitigate a cost associated with retrieving the file from the archive data store.

In certain embodiments, the disclosed subject matter can comprise a system that can include a memory that stores computer executable components, and a processor that executes computer executable components stored in the memory. The computer executable components can comprise a file manager component that generates a file identifier associated with a file based at least in part on file information of the file and a defined hash function, and stores the file identifier in a reference file associated with the file, wherein the reference file is stored in a primary storage component of a storage system. The computer executable components also can include a storage manager component that stores the file in a secondary storage component that is external to the storage system, wherein, in response to a request for the file stored in the secondary storage component, the file identifier is usable to determine whether a copy of the file is stored on the primary storage component to mitigate a cost associated with retrieving the file from the secondary storage component.

In still other embodiments, a machine-readable storage medium, comprising executable instructions that, when executed by a processor, facilitate performance of operations. The operations can comprise determining a hash value associated with a file based at least in part on file data of the file and a defined hash function. The operations also can comprise storing the hash value in a stub file associated with the file, wherein the stub file is stored in a primary data store. The operations further can comprise storing the file in a secondary data store that is remote from the primary data store, wherein, in response to a request for the file from the secondary data store, the hash value is able to be used to determine whether a copy of the file is stored on the primary data store to mitigate a cost associated with obtaining the file from the secondary data store.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
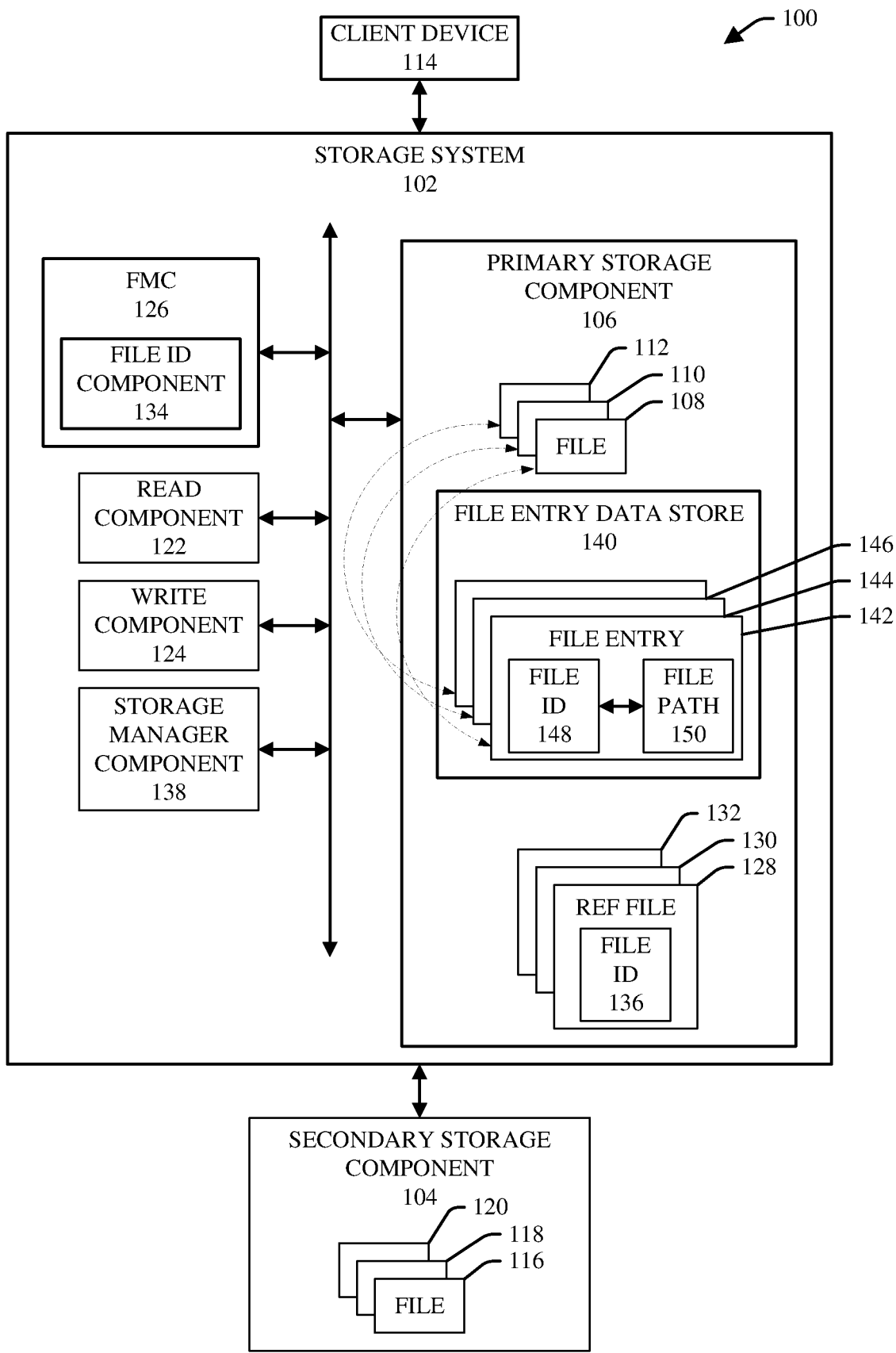
FIG. 1 illustrates a block diagram of an example system that can utilize file identifiers (e.g., file fingerprints or hash values) to facilitate desirably managing the reading and recalling of files stored in a storage system or associated secondary storage component, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

A storage platform can be or can comprise a storage system that can be employed to store data. The storage platform can employ an operating system (e.g., a file system) and can serve as a file server. The file system typically can be employed to maintain files (e.g., electronic files), comprising data (e.g., electronic or digital data), including keeping track of the locations of files and associated data in memory to enable accessing of the files stored in, and retrieval of the files from, the memory of the storage platform. The files, including data associated with the files, often can be processed in a number of ways when data is being written to or read from files and when the files are being stored in, or retrieved from, the memory.

The storage system can provide facility to archive files, as desired, to an archived environment (e.g., an archived storage), such as a cloud computing environment. On a shared storage system, multiple users and/or multiple applications can read or write files. As a result, some files may be archived in the archived environment, as per an archival policy, while other files (whether archived or not) can still be present (e.g., stored) on the primary storage (e.g., local storage) of the shared storage system. Such an archival to the archived environment may not make available (e.g., free up) any storage space on the primary storage, since, even if a file is archived in the archived environment, a local copy of that file can still reside in the primary storage. Rather, the read or recall of a file from the archived environment can cause undesirable (e.g., extra or unnecessary) access delay in reading the file, network usage in reading the file, and/or costs in reading the file, etc., to the client because a file read operation from the client for the archived file can cause that file to be read or recalled from the archived (e.g., cloud) environment without considering that there is another file (e.g., local copy of that file) with the same content that can be available locally on the primary storage.

Furthermore, even if no local copy of an archived file exists on the primary storage, a local copy of the archived file potentially can come into existence in the future, for example, as a result of a write operation or a read operation. The new copy of such file can remain on the primary storage for a relatively long time, while an archived copy of such file can be stored in the archived storage (e.g., in cloud storage). Again, this may not make available any storage space on the primary storage, and still can cause the undesirable access delay in reading the file, network usage in reading the file, and/or costs in reading the file, etc.

With regard to both of the above scenarios where a copy (e.g., local copy) of an archived file can be available locally on the primary storage, it can be desirable to serve (e.g., perform) a read request for an archived file without making an actual call to the archived storage (e.g., cloud storage) to read or recall the archived file.

To that end, techniques for desirably (e.g., efficiently, suitably, or optimally) managing files to mitigate undesirable reading of files from a secondary storage component of or associated with a storage system are presented. The storage system can comprise a primary (e.g., local) storage component in which files (e.g., locally stored files) can be stored. The secondary (e.g., cloud, archive, or external) storage component of or associated with the storage system can be utilized to store or archive certain files (e.g., files not expected to be accessed within a defined amount of time), as desired.

The storage system can comprise a file management component (FMC) that can determine respective file identifiers (file IDs) for respective files stored in the secondary storage component, and can store the respective file IDs and other desired information (e.g., data objects, metadata objects, and/or cache data) in respective reference files (e.g., stub files) associated with the respective files. The FMC also can determine respective file IDs for respective files stored in the primary storage component, and can store the respective file IDs in a file entry data store (e.g., in a table stored in the file entry data store) in the primary storage component.

In response to a client request (e.g., request to read a file) received from a client device, FMC can determine whether a local file stored in the primary storage component is a copy of an archived file stored in the secondary storage component based at least in part on whether the file ID associated with the local file, and a file ID associated with a snapshot (e.g., snapshot copy) of the local file, satisfies a defined match criterion (e.g., matches) with respect to the file ID associated with the archived file. If the FMC determines that the file ID associated with the local file, and the file ID associated with the snapshot, each satisfy the defined match criterion (e.g., match) with respect to the file ID associated with the archived file, the FMC can determine that the local file and associated snapshot are a copy of the archived file, and the FMC can read the snapshot of the local file and provide it to the client device in response to the client request, instead of reading or recalling the archived file from the secondary storage component and incurring the undesirable costs associated with reading or recalling the archived file from the secondary storage component. If, instead, the FMC determines that the file ID associated with the local file, or the file ID associated with the snapshot, do not satisfy the defined match criterion (e.g., match) with respect to the file ID associated with the archived file, the FMC can determine that the local file or associated snapshot is not a copy of the archived file, can determine that the archived file is to be provided to the client device in response to the client request, and can read or recall the archived file from the secondary storage component and provide it to the client in response to the client request.

These and other aspects and embodiments of the disclosed subject matter will now be described with respect to the drawings.

Referring now to the drawings, FIG. 1 illustrates a block diagram of an example system 100 that can utilize file IDs (e.g., file fingerprints or hash values) to facilitate desirably (e.g., efficiently, suitably, or optimally) managing the reading and recalling of files stored in a storage system or associated secondary storage component, in accordance with various aspects and embodiments of the disclosed subject matter. The system 100 can comprise a storage system 102 that can be utilized to store information (e.g., files, data, . . . ), manage a file system of or associated with the storage system 102, and manage the storing, retrieving, and processing of files or data being written to, read from, or stored in the storage system 102 or a storage component, such as a secondary storage component 104 (e.g., archive, external, remote, or cloud storage component), that can be associated with (e.g., communicatively connected to) the storage system 102 (as depicted in FIG. 1). While the secondary storage component 104 is depicted in FIG. 1 as being separate from the storage system 102, in some embodiments, the secondary storage component 104 can be part of the storage system 102.

The storage system 102 can comprise a primary storage component 106 (e.g., local storage component) that can be utilized to store files, such as, for example, files 108, 110, and 112, and other information (e.g., information relating to or that can facilitate management of files). The primary storage component 106 can comprise storage locations, processing resources, memory (e.g., volatile and/or nonvolatile memory), and/or other components to facilitate storing and/or managing files (e.g., files 108, 110, 112) and the other information.

In some embodiments, the primary storage component 106 can comprise a plurality of nodes (not individually or explicitly shown in FIG. 1 for reasons of brevity and clarity) that can be employed to service client requests from clients (e.g., via client device 114) with regard to storing, retrieving, and processing of files (e.g., files 108, 110, 112) or data being written to, read from, or stored in the storage system 102 (e.g., the primary storage component 106 of the storage system 102). The storage system 102 (e.g., the primary storage component 106 of the storage system 102) can be scalable to add (or remove) nodes, as desired. The primary storage component 106 can include, for example, one or more clusters of nodes, wherein each cluster can comprise a desired number of nodes (e.g., one node, two nodes, three nodes, four nodes, . . . , 100 nodes, . . . , 144 nodes, . . . 200 nodes, . . . , 252 nodes, or more than 252 nodes). In certain embodiments, a cluster of nodes can be a network attached storage (NAS) cluster.

Each node can comprise a processor component (e.g., one or more processors, including a CPU), network components, data storage (e.g., storage media), memory (e.g., volatile memory, such as random access memory (RAM) or RAM-type memory, or nonvolatile memory), interconnect components (e.g., Ethernet or other low-latency interconnect components), controller components (e.g., disk controllers), and/or other desired components. Respective nodes of a cluster can be the same as or different from each other with regard to the respective components of the respective nodes and/or the respective features, capabilities, or capacities of the respective nodes. The nodes, employing their respective network components, can network to and communicate with each other, and can network to and communicate with other components or devices of or associated with the storage system 102. Each of the nodes can be associated with one or more IP addresses (e.g., virtual IP addresses) that can be used to facilitate respectively connecting the nodes to other devices (e.g., client devices, such as client device 114) or components to facilitate communication of information between the nodes and the other devices or components.

In certain embodiments, the storage system 102 (e.g., the primary storage component 106 of the storage system 102) can leverage the nodes of a cluster, for example, by grouping together respective components, features, or capabilities of the respective nodes. For instance, the storage system 102 can group together the respective memories of the respective nodes so that they can operate together (e.g., to form a single coherent cache memory), allow input/output (I/O) on any part of the cluster to benefit from data cached anywhere in the cluster, and/or combine (e.g., group) resources (e.g., processing resources, such as CPU), spindles, or other components of the nodes to increase throughput, capacity, I/O per second (IOPS), etc., of the cluster, particularly as the cluster grows in size (e.g., as more nodes are added to the cluster), etc.

The secondary storage component 104 (e.g., archive, external, remote, or cloud storage component) can be utilized to archive and store files (e.g., archived files), such as, for example, files 116, 118, and 120, in a desirable (e.g., cost effective) manner. For instance, the secondary storage component 104 can be employed to store desired files (e.g., files 116, 118, and 120), such as files that are not expected to be accessed in the near future, in a desirable manner In some embodiments, the secondary storage component 104 can be a cloud-based storage component that can be part of a cloud computing environment of or associated with the storage system 102. In certain embodiments, the secondary storage component 104 can comprise a plurality of nodes, which can be structured to form one or more clusters (e.g., one or more sets of nodes), in a manner that can be similar to the primary storage component 106. In other embodiments, the secondary storage component 104 can comprise another type(s) of data storage, comprising data storage locations, in which files (e.g., files 116, 118, and 120) and other information can be stored.

At given times, one or more clients can utilize a client device, such as client device 114, to communicate with and access the storage system 102. The client device 114 can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, . . . ), a set-top box, an Internet Protocol (IP) television (IPTV), Internet of things (IoT) device (e.g., medical device, electronic speaker with voice controller, camera device, security device, tracking device, appliance, . . . ), or other desired type of communication device. The client device 114 can communicate a client request to the storage system 102 to request that the storage system 102 access or retrieve information (e.g., files 108, 110, or 112; or files 116, 118, or 120; or other information) stored in the storage system 102 or stored in the secondary storage component 104, write or store information (e.g., file data or other information) to or in the storage system 102 or the secondary storage component 104, process information (e.g., files or other information) stored in the storage system 102 or received from the client device 114 or other data source (e.g., other device), and/or perform other operations on information of or associated with the storage system 102.

The storage system 102 can comprise a read component 122 that can be utilized to perform (e.g., execute) read requests to read files (e.g., files 108, 110, or 112; or files 116, 118, or 120) or other information from the primary storage component 106 or secondary storage component 104, for example, in response to client requests from clients (e.g., via client device 114). The storage system 102 also can comprise a write component 124 that can be utilized to perform (e.g., execute) write requests to enable writing or updating (e.g., modifying) files (e.g., files 108, 110, or 112; or files 116, 118, or 120) or other information, for example, in response to client requests from clients (e.g., via client device 114), wherein the files can be written to or stored in the primary storage component 106 or secondary storage component 104, as desired.

The system 100 also can comprise a file manager component (FMC) 126 that can be part of the storage system 102 (as depicted in FIG. 1) or associated with (e.g., communicatively connected to) the storage system 102 and the secondary storage component 104. The FMC 126 can be employed to manage files (e.g., files 108, 110, or 112; or files 116, 118, or 120) stored in the primary storage component 106 and secondary storage component 104, including the reading, recalling, or retrieving of files or other information from the primary storage component 106 and secondary storage component 104, and the writing or storage of files or other information to or in the primary storage component 106 and secondary storage component 104, in accordance with defined file management criteria and defined file management algorithms In certain embodiments, while the read component 122 and write component 124 are depicted as being separate from the FMC 126 in FIG. 1, the read component 122 and/or write component 124 can be part of the FMC 126.

In some embodiments, the FMC 126 can generate (e.g., create) and manage respective reference files (e.g., stub files), such as, for example, reference file 128 (REF FILE), reference file 130, and reference file 132, associated with respective files (e.g., files 116, 118, or 120) stored in the secondary storage component 104, and the FMC 126 can store and maintain the respective reference files (e.g., reference files 128, 130, 132) in the primary storage component 106. A reference file (e.g., reference file 128) associated with a file (e.g., a file 108) stored in the secondary storage component 104 can comprise information (e.g., data objects, metadata objects, cache data, and/or file ID) of or relating to the file.

In some embodiments, to facilitate desirably managing files (e.g., files 108, 110, or 112; or files 116, 118, or 120), the FMC 126 can comprise a file identifier (ID) component 134 that can generate file IDs (e.g., file fingerprints or hash values), such as file ID 136, for files that can be used to facilitate identifying files (e.g., files 116, 118, and/or 120 stored in the secondary storage component 104), and copies (e.g., local copies) of files (e.g., certain files of the files 108, 110, and/or 112 stored in the primary storage component 106), to facilitate mitigating costs (e.g., time costs, resource costs, and/or financial costs, . . . ) associated with retrieving (e.g., reading or recalling) files, such as, for example, files (e.g., files 116, 118, and/or 120) stored in the secondary storage component 104. For instance, for each file stored or to be stored in the secondary storage component 104, the file ID component 134 can determine (e.g., calculate) or generate a file ID (e.g., file ID 136, second file ID (not shown), or third file ID (not shown), . . . ) based at least in part on file data of the file (e.g., file 116, file 118, or file 120) and a defined hash function, wherein the defined hash function can be part of or associated with a defined hash algorithm. Since, for example, the file data of file 116 can be different from second file data of a second file (e.g., file 118), the file ID 136 (e.g., file fingerprint or hash value) determined by the file ID component 134 for file 116 can be different from the second file ID (e.g., second file fingerprint or second hash value) determined by the file ID component 134 for the second file (e.g., file 118). The FMC 126 can store the respective file IDs (e.g., file ID 136, second file ID, or third file ID, . . . ) in the respective reference files (e.g., reference file 128, reference file 130, or reference file 132, . . . ) associated with the respective files (e.g., file 116, file 118, or file 120, . . . ) stored in the secondary storage component 104. Also, as more fully described herein, the file ID component 134 can determine or generate file IDs for local files (e.g., certain of the files 108, 110, and/or 112) stored in the primary storage component 106, wherein the local files can be copies of archived files (e.g., files 116, 118, and/or 120) stored in the secondary storage component 104.

Figure 2:
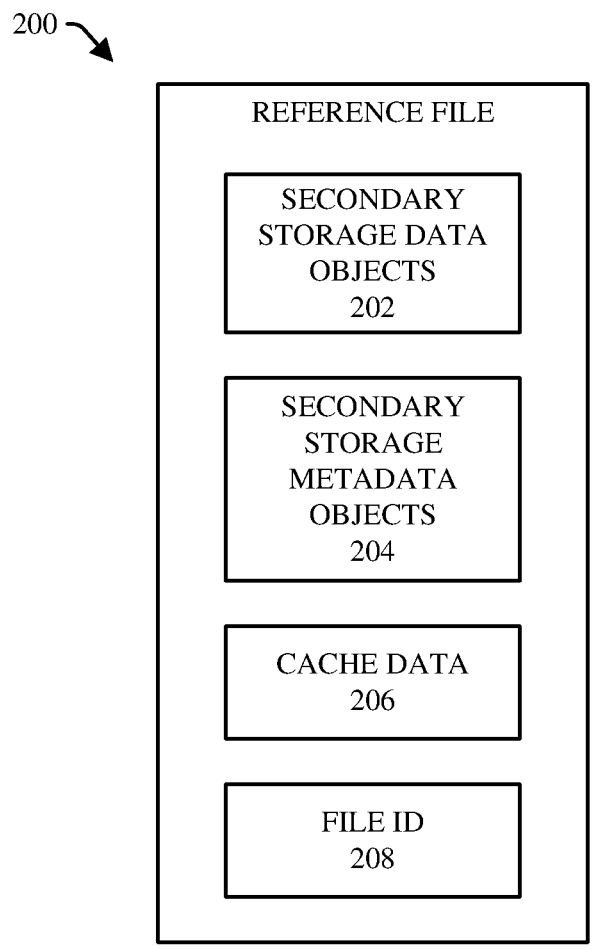
FIG. 2 depicts a block diagram of an example reference file associated with a file stored in a secondary storage component, in accordance with various aspects and embodiments of the disclosed subject matter.

Referring briefly to FIG. 2 (along with FIG. 1), FIG. 2 depicts a block diagram of an example reference file 200 (e.g., stub file) associated with a file (e.g., file 116) stored in the secondary (e.g., archive) storage component 104, in accordance with various aspects and embodiments of the disclosed subject matter. The FMC 126 can generate and manage the reference file 200. The reference file 200 can comprise, for example, secondary storage data objects 202 (e.g., cloud or archive data objects) that can be created by the FMC 126. For instance, when the FMC 126 determines that a file is to be stored or archived in the secondary storage component 104, the FMC 126 can generate (e.g., create) secondary storage data objects 202 that can comprise portions of the data of the file and/or information relating to the file data. For instance, in connection with storing the file in the secondary storage component 104, the FMC 126 can divide or segment the file into portions of the file data, and can generate secondary storage data objects 202 can that comprise information regarding the storage of the portions (e.g., data objects) of the file data in the secondary storage component 104, wherein such information of the secondary storage data objects 202 can include, for example, respective file paths or storage locations of respective data objects of the file in the secondary storage component 104, respective sequence numbers of the respective data objects that can indicate the order that the respective data objects are to be in when presenting the file, and/or other desired information regarding the file (e.g., file 116).

The FMC 126 also can generate secondary storage metadata objects 204 of or relating to the file. The FMC 126 can store the secondary storage metadata objects 204 in the reference file 200. The secondary storage metadata objects 204 can comprise information relating to the file (e.g., file 116), such as, for example, the type of file (e.g., video file, audio file, text file, . . . ), the size of the file, the creation date of the file, modification information (e.g., modification dates or times, file version information) relating to the file, file format (e.g., video format, audio format, text format, . . . ) of the file, application associated with the file (e.g., application used to create the file, application that is compatible with the file), author or creator of the file, and/or other desired information regarding the file.

In some instances, the FMC 126 also can store cache data 206, or information relating to the cache data (e.g., location of the cache data in the cache memory component of the primary storage component 106), in the reference file 200, wherein the cache data can comprise desired data of the file (e.g., file 116). For instance, when data of the file (e.g., file 116) has been read from the file or has been written to the file, the FMC 126 can maintain all or a desired portion of the data of the file in cache memory component of the primary storage component 106 (or other cache memory of the storage system 102) for a desired amount of time, and the FMC 126 can maintain that cache data, or information relating to such cache data, as cache data 206 in the reference file 200. By storing all or a desired portion of the data of the file in cache memory component of or associated with the primary storage component 106, during an imminent (e.g., a next immediate) or potentially imminent read or write operation for such file data of the file, the FMC 126 can enable that cached data of the file (e.g., file 116) to be read locally from the cache memory component, instead of having to read or recall such file data from the secondary storage component 104. After a desired amount of time, if there is no read or write operation for that file, the FMC 126 can remove (e.g., delete or override) that file data in the cache memory component in order to make space available in the cache memory component of or associated with the primary storage component 106 for other data.

In some embodiments, to facilitate desirably managing files, the FMC 126, employing the file ID component 134, can generate file IDs (e.g., file ID 136) for files (e.g., files 116, 118, and/or 120) that can be used to facilitate identifying files, and copies (e.g., local copies) of files (e.g., certain of the files 108, 110, and/or 112), to facilitate mitigating costs (e.g., time costs, resource costs, and/or financial costs, . . . ) associated with retrieving (e.g., reading or recalling) files, such as, for example, files stored in the secondary storage component 104, as more fully described herein. For example, with regard to the reference file 200, the file ID component 134 can determine a file ID 208 based at least in part on file data of the file (e.g., file 116) and the defined hash function (e.g., by applying the defined hash function to the file data), and the FMC 126 can store the file ID 208 in the reference file 200. The FMC 126 or another desired component (e.g., storage manager component 138) can store or facilitate storing the file in the secondary storage component 104 (e.g., in a specified storage location(s) in the secondary storage component 104, and the FMC 126 can maintain the reference file 200 associated with the file (e.g., file 116) in the primary storage component 106. In accordance with various embodiments, the storage manager component 138, which can be associated with the FMC 126 (as depicted in FIG. 1) or part of the FMC 126 (in other embodiments), can store the file in the secondary storage component 104.

With further regard to FIG. 1, in accordance with various embodiments, the file ID component 134 can employ virtually any desired hash algorithm and associated hash function to determine or generate file IDs for files. The hash algorithm employed by the file ID component 134 can be a non-cryptographic or cryptographic hash algorithm. It can be desirable for the hash algorithm to be a relatively fast hash algorithm that can allow the file ID component 134 to determine or generate file IDs for files relatively quickly. As some non-limiting examples, to determine or generate a file ID for a file (e.g., file 108, or file 116), the file ID component 126 can employ a secure hash algorithm (SHA) algorithm, such as the SHA-1 algorithm, SHA-256 algorithm, SHA-512 algorithm, or other type of SHA algorithm, xxhash-type algorithm (e.g., xxhash, xxh32, xxh64, xxh3, . . . ), a CityHash algorithm (e.g., CityHash256 algorithm that can hash 256-bit hash codes, CityHash128 algorithm that can hash 128-bit hash codes, or CityHash64 algorithm that can hash 64-bit hash codes), a cyclic redundancy check (CRC) algorithm (e.g., 32-bit CRC algorithm), a proprietary hash algorithm, or other type of hash algorithm.

The FMC 126 also can manage file IDs (e.g., file ID 136) when files (e.g., file 116) have been modified (e.g., all or a portion of a file has been modified). For instance, if an entire file (e.g., file 116) is to be retrieved to modify the file, the FMC 126 (e.g., employing the storage manager component 138 and/or read component 122) can read (e.g., fetch or recall) the file from the secondary storage component 104. After the file (e.g., file 116) has been read from the secondary storage component 104 and is received by the storage system 102, the file can be modified (e.g., using the write component 124 and/or another component to write, create, or modify content of the file), as desired, to generate a modified file. The file ID component 134 can determine, generate, or update the file ID (e.g., determine an updated file ID that updates file ID 136) for the modified file, and the FMC 126 can store that file ID (e.g., updated or new file ID for the modified file) in the reference file (e.g., reference file 128) associated with the modified file (e.g., file 116, as modified). The FMC 126 also can determine or update data objects, metadata objects, and/or other metadata (e.g., updated data objects, updated metadata objects, and/or other updated metadata) associated with the modified file, and can store such data objects, metadata objects, and/or other metadata in the reference file (e.g., reference file 128) associated with the modified file. Cache data associated with the file also can be modified in connection with modifying the file, and the modified cache data, or information relating thereto, can be stored in the reference file. The reference file (e.g., reference file 128, as modified) can be stored in the primary storage component 106. The FMC 126 (e.g., employing the storage manager component 138) can store the modified file in the secondary storage component 104.

If, instead, only a portion of the file (e.g., file 116) is requested and retrieved from the secondary storage component 104, and the portion of the file is modified (e.g., using the write component 124 and/or another component to write, create, or modify content of the portion of the file), the FMC 126 can access the reference file (e.g., reference file 128) associated with the file, and can determine whether a file ID is in the reference file. If the FMC 126 determines that there is a file ID (e.g., file ID 136) in the reference file, the FMC 126 can delete the file ID from the reference file, because that file ID is no longer value due to the portion of the file being modified. The FMC 126 also can determine or update data objects (e.g., secondary storage or cloud data objects), metadata objects (e.g., secondary storage or cloud metadata objects), and/or other metadata (e.g., updated data objects, updated metadata objects, and/or other updated metadata) associated with the modified portion of the file, and can store such data objects, metadata objects, and/or other metadata in the reference file (e.g., reference file 128) associated with the modified portion of the file. Cache data associated with the file also can be modified in connection with modifying the portion of the file, and the modified cache data, or information relating thereto, can be stored in the reference file. The reference file (e.g., reference file 128, as modified) can be stored in the primary storage component 106. The FMC 126 (e.g., employing the storage manager component 138) can archive the file (as modified) by storing the modified portion of the file in the secondary storage component 104.

In some embodiments, the storage system 102 can comprise a file entry data store 140 that can be utilized to store file entries. The FMC 126 can generate file entries, such as, for example, file entry 142, file entry 144, and file entry 146, that can be associated with respective files (e.g., files 108, 110, and 112) stored in the primary storage component 106, wherein at least a portion of such respective files can be local copies of the files (e.g., files 116, 118, and 120) stored in the secondary storage component 104. The FMC 126 can employ the file ID component 134 to determine or generate respective file IDs for the respective files (e.g., files 108, 110, and 112) of the primary storage component 106 based at least in part on the respective file data of the respective files and the defined hash function, and the FMC 126 can store the respective file IDs in the respective file entries (e.g., file entries 142, 144, and 146) in the file entry data store 140. For example, the file ID component 134 can determine and generate a file ID 148 associated with file 108 based at least in part on the file data of file 108 and the defined hash function, and the FMC 126 can store the file ID 148 in the file entry 142 associated with the file 108.

Also, for each file (e.g., local file) written to and/or stored in the primary storage component 106, the FMC 126 can determine a file path, comprising file path information, associated with that file (e.g., local file) that can indicate the storage location of that file, and/or the path to and/or location of that file in the file directory, of the primary storage component 106. For example, with regard to file 108, when the file 108 is being written to or stored in the primary storage component 106, the FMC 126 can determine the file path 150 of the file 108 in the primary storage component 106. The FMC 126 can analyze or check the file entry data store 140 to determine whether the file (e.g., file 108) and/or associated file path exists in the file entry data store 140. In response to determining that the file or associated file path does not exist in the file entry data store 140, the FMC 126 can create a new file entry (e.g., file entry 142) in the file entry data store 140, and the FMC 126 can store the file path 150 and the file ID 148 in such new file entry. The file path information can comprise the file 108 (e.g., file data of the file 108) and/or other file path information that can indicate the storage location of file 108, and/or the path to and/or location of file 108 in the file directory, in the primary storage component 106. If, instead, based at least in part on the analyzing or checking of the file entry data store 140, the FMC 126 determines that the file or associated file path already exists in the file entry data store 140, the FMC 126 can update (e.g., modify) the file entry (e.g., file entry 142) in the file entry data store 140 by updating the file ID (e.g., updating the file ID to file ID 148) in the file entry 142 in the file entry data store 140.

In some embodiments, if the FMC 126 or another component of the storage system 102 is utilized to delete a file (e.g., file 108) from the primary storage component 106 (e.g., in response to a request to delete such file received from a client (e.g., via the client device 114) and/or application associated with the storage system 102), the FMC 126 can delete the corresponding file entry (e.g., file entry 142) from the file entry data store 140. If the FMC 126 or another component of the storage system 102 is utilized to rename a file (e.g., file 108) or move such file to a different storage location or different location in the file directory in the primary storage component 106 (e.g., in response to a request to rename or move such file that is received from a client (e.g., via the client device 114) and/or application associated with the storage system 102), the FMC 126 can update the file entry (e.g., file entry 142) associated with the file (e.g., file 108) to update the file path (e.g., file path 150) associated with such file, including updating the file path information associated with the file to reflect the renaming of the file or the moving of the file to a different storage location or different location in the file directory in the primary storage component 106.

In certain embodiments, the file entry data store 140 can be or can comprise a file ID table (e.g., a file fingerprint table (FFT)), and the FMC 126 can store the file entries (e.g., file entries 142, 144, and 146), comprising the respective file paths (e.g., file path 150) and the respective file IDs (e.g., file ID 148) in the file ID table (e.g., store the respective file paths and respective file IDs as respective table entries, such as <file_path, file_hash>).

In some embodiments, the FMC 126 can determine and store file IDs associated with files (e.g., local files) stored in the primary storage component 106 using a job function, such as a lower priority job function, in accordance with the defined file management criteria, which can mitigate (e.g., reduce or minimize) the cost (e.g., resource costs, time costs, or financial costs) associated with determining and storing file IDs associated with files stored in the primary storage component 106. The lower priority job functions can perform such functions (e.g., determining and storing file IDs of modified or new files), for example, in the background and/or when desired resources can be available. For instance, the FMC 126 can employ the job function to take (e.g., capture, generate, or create) a differential snapshot (e.g., differential snapshot copy) of the primary storage component 106 (e.g., of the files and/or file directories stored in the primary storage component 106). The differential snapshot can indicate the difference (e.g., the changes) between the files stored in the primary storage component 106 at the time the differential snapshot was taken and a previous snapshot of files stored in the primary storage component 106, wherein previous snapshot can be a snapshot of the primary storage component 106 taken by the job function after a previous time where the FMC 126, employing the job function, updated the file entry data store 140 based at least in part on changed or created files determined by the FMC 126 from a previous differential snapshot of the primary storage component 106.

For example, the FMC 126, employing the job function, can compare the differential snapshot of the primary storage component 106 with the previous snapshot of the primary storage component 106. Based at least in part on the results of comparing the differential snapshot to the previous snapshot, the FMC 126, employing the job function, can determine any changes made to files of the primary storage component 106 since the previous snapshot was taken, can determine files that were created and stored in the primary storage component 106 since the previous snapshot was taken, and/or can determine files that were deleted from the primary storage component 106 since the previous snapshot was taken. Accordingly, based at least in part on such comparison results and determinations, the FMC 126, employing the job function, can determine and generate updated file IDs for any changed files of the primary storage component 106 based at least in part on the changed file data of such files and the defined hash function, and/or can determine updated file paths based at least in part on the changes to such files, and can update the file entries in the file entry data store 140 to update (e.g., modify or change) any file IDs in the file entries for any changed files to the updated file IDs and/or update any file paths in the file entries for any changed files to updated file paths (e.g., if a file has been renamed or moved to a different location in the primary storage component 106); can determine or generate (e.g., create) file IDs for any new files stored in the primary storage component 106 based at least in part on the file data of such files and the defined hash function, and/or can determine file paths for such new files based at least in part on the locations of such files in the file directory of the primary storage component 106, can determine or generate new file entries for such new files, comprising the file IDs and file paths of such new files, and can store the new file entries in the file entry data store 140; and/or can delete the file ID and/or file path of any deleted file from the file entry data store 140.

With further regard to snapshots taken by the FMC 126, a snapshot can be an unmodifiable, read-only, point-in-time copy of a directory, a subdirectory, a file path, and/or a file of the storage system 102, or portion thereof, such as the primary storage component 106. The snapshot can preserve the exact state of the file system or portion thereof (e.g., storage system 102 or portion thereof) at the instant the snapshot is taken by the FMC 126. The snapshot can be utilized to identify changes to the file system, create a backup of the file system, or restore files that have been inadvertently changed or deleted, for example. A snapshot basically can be a logical pointer to data (e.g., file data) that is stored in the storage system 102, or portion thereof (e.g., in the primary storage component 106, such as in a cluster of nodes of the primary storage component 106), at a particular point in time. Each snapshot can reference a specific directory under the file system and can include all of the files stored in that directory and its subdirectories. If the data referenced by a snapshot is modified, the snapshot can store a physical copy of the data that was modified. Typically, when generating a snapshot, the FMC 126 can store only the changed blocks of data of a file in the snapshot, which can ensure desirable (e.g., very efficient) storage capacity utilization. Also, generating snapshots can be relatively efficient, as the generation of snapshots can result in a relatively small amount of performance overhead, regardless of the level of activity of the file system, the size of the file system, or the size of the directory being copied. Snapshots either can be created according to user configuration or automatically can be generated by the FMC 126 to facilitate system operations, including, for example, file management and servicing of client requests for files or other information.

In accordance with various embodiments, the FMC 126 can identify and locate snapshots by a unique name or a system generated (e.g., FMC generated) snapshot ID. A snapshot name of a snapshot can be specified by a user and assigned to a virtual directory (not shown) of the primary storage component 106, wherein the virtual directory can comprise the snapshot. A snapshot ID can be a numerical ID that the FMC 126 automatically can assign to the snapshot.

In some embodiments, with regard to a file (e.g., file 116) that has been stored (e.g., archived) in the secondary storage component 104, in response to a request to access the file that is received from a client (e.g., via the client device 114), instead of reading, recalling, or retrieving the file (e.g., file 116) from the secondary storage component 104, the FMC 126 can read, recall, or retrieve the requested file by accessing a local copy (e.g., file 108) of that file in the primary storage component 106 without having to incur the additional costs of reading, recalling, or retrieving the file (e.g., file 116) from the secondary storage component 104.

Figure 3:
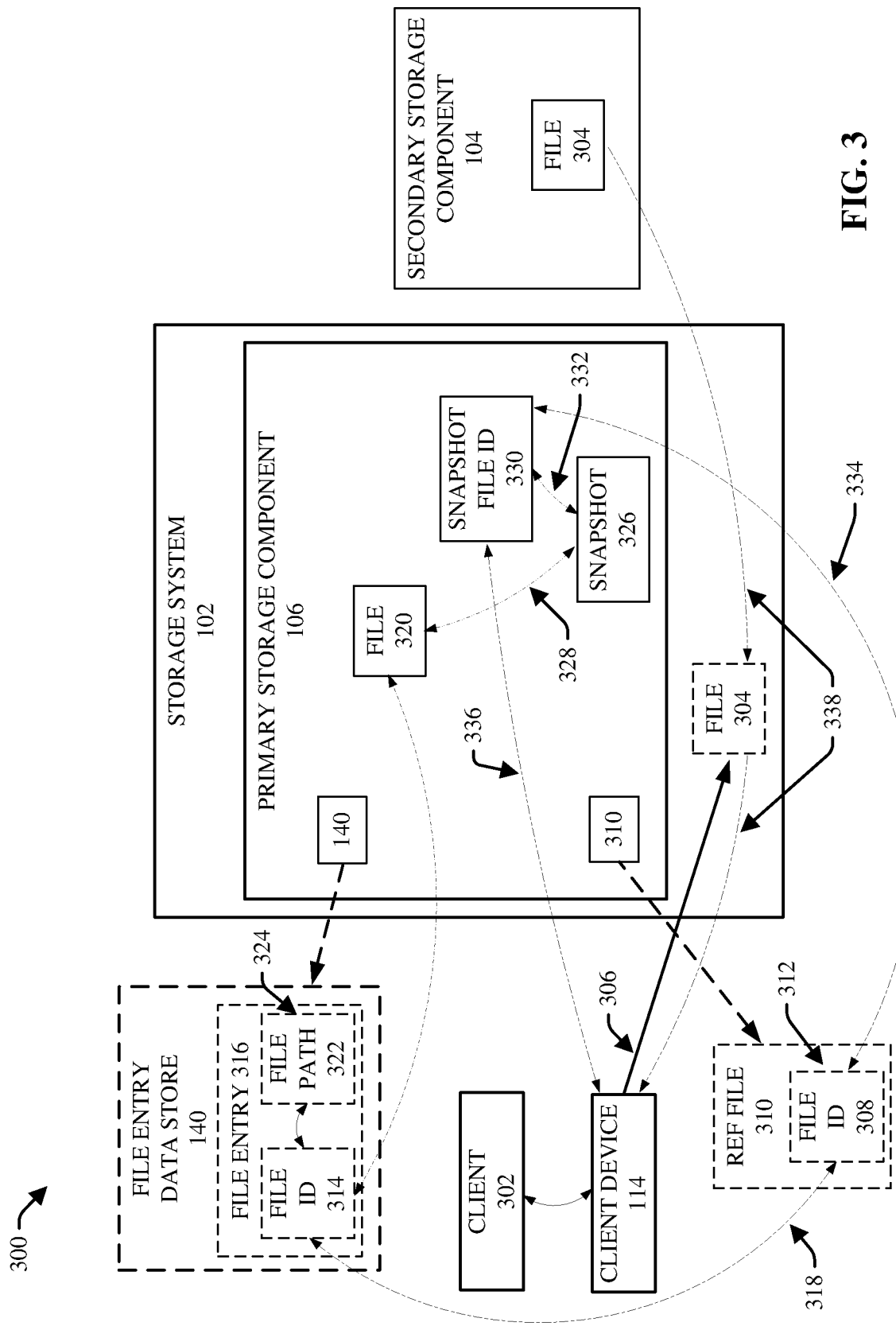
FIG. 3 illustrates a block diagram of an example process flow for reading a local file, stored in a primary storage component of the storage system, that is a copy of an archived file stored in the secondary storage component, instead of reading or recalling the archived file from the secondary storage component, in accordance with various aspects and embodiments of the disclosed subject matter.

Referring to FIG. 3 (along with FIG. 1), FIG. 3 illustrates a block diagram of an example process flow 300 for reading a local file, stored in the primary storage component 106 of the storage system 102, that is a copy of an archived file stored in the secondary storage component 104, instead of reading or recalling the archived file from the secondary storage component 104, in accordance with various aspects and embodiments of the disclosed subject matter. The storage system 102 can receive a read request (or other type of request involving reading of a file) from a client device 114 associated with a client 302 to read a desired file 304, wherein that desired file 304 can be stored (e.g., archived) in the secondary storage component 104 (e.g., archive or cloud storage component) that can be associated with (e.g., communicatively connected to) the storage system 102 (as depicted by reference numeral 306).

In response to the request (e.g., read request or other type of request) to read the file or involving the reading of the file, the FMC 126 can determine whether a file ID 308 is available in a reference file 310 (REF FILE) associated with the file 304 (as indicated by reference numeral 312). For instance, the FMC 126 can search for and access the reference file 310 in the primary storage component 106 and can analyze the reference file 310 associated with the file 304 to determine whether there is a file ID 308 in the reference file 310.

If the FMC 126 determines that there is a file ID 308 in the reference file 310, the FMC 126 can determine whether a file ID 314 that satisfies a defined match criterion with respect to file ID 308 is in a file entry 316 in the file entry data store 140 (as depicted at reference numeral 318), wherein the file ID 314 can be associated with a file 320 stored in the primary storage component 106. For instance, the FMC 126 can compare the file ID 308 to file IDs in the file entry data store 140 to determine whether there is a file ID (e.g., file ID 314) in the file entry data store 140 that matches the file ID 308. Based at least in part on the analysis (e.g., comparison), the FMC 126 can determine whether there is a file ID 314 in a file entry 316 in the file entry data store 140 (e.g., in the FFT stored in the file entry data store 140) that matches the file ID 308, wherein such file ID 314 can be associated with a file 320 (e.g., local file) stored in the primary storage component 106, and wherein a match between the file ID 314 and the file ID 308 can indicate that there is a local file (e.g., file 320) stored in the primary storage component 106 that is the same as the archived file (e.g., file 304) requested by the client device 114 and stored in the secondary storage component 104.

If the FMC 126 determines that there is a file ID 314 in a file entry 316 in the file entry data store 140 that satisfies the defined match criterion with respect to the file ID 308 associated with the requested file 304, the FMC 126 can read the file path 322 associated with the file ID 314 and stored in the file entry data store 140 (as indicated at reference numeral 324). The file entry 316 can comprise information, including the file ID 314 and the file path 322, which can be associated with the file ID 314. The file path 322 can comprise the file 320 and/or other file path information that can indicate the storage location of the file 320, and/or the location in and the file path to the file 320 in the file directory, in the primary storage component 106.

In response to reading the file path 322, the FMC 126 can take (e.g., capture or generate) a snapshot 326 (e.g., snapshot copy, snapshot image, or snapshot of data) of the file path 322, comprising the file 320 (as indicated at reference numeral 328). The FMC 126, employing the file ID component 134, can determine and generate a file ID 330 of the snapshot 326 (as indicated at reference numeral 332), based at least in part on file data of the snapshot 326 and the defined hash function, wherein the file data of the snapshot 326 can correspond to (e.g., be the same as) the file data of the file 320 at the time the snapshot 326 was taken.

The FMC 126 can determine whether the file ID 330 associated with the snapshot 326 satisfies the defined match criterion with respect to file ID 308 (as depicted at reference numeral 334). For instance, the FMC 126 can compare the file ID 330 associated with the snapshot 326 to the file ID 308 associated with the requested file 304 to determine whether the file ID 330 matches the file ID 308 wherein a match between the file ID 330 and the file ID 308 can indicate that the snapshot 326 of the local file 320 stored in the primary storage component 106 is the same as the archived file 304 requested by the client device 114 and stored in the secondary storage component 104. Based at least in part on the analysis (e.g., comparison), if the FMC 126 determines that the file ID 330 matches the file ID 308 (e.g., satisfies the defined match criterion), the FMC 126 can read the snapshot 326 of the local file 320 from the primary storage component 106 and provide that read snapshot 326 to the client device 114 in response to the request, instead of reading or recalling the file 304 from the secondary storage component 104 (as depicted at reference numeral 336).

If, instead, the FMC 126 determines that there is no file ID in the reference file 310 (or no reference file associated with the file 304), or if the FMC 126 determines that there is no file ID in the file entry data store 140 that matches the file ID 308 associated with the requested file 304, or if the FMC determines that the file ID 330 associated with the snapshot 326 does not match the file ID 308 associated with the requested file 304, the FMC 126 can determine that the file 304 is to be read from the secondary storage component 104, and can read or recall the file 304 from the secondary storage component 104 and provide (e.g., communicate) the file 304 to the client device 114 (as depicted at reference numeral 338). If a snapshot 326 of the file 320 had been created, the FMC 126 can delete the snapshot 326 from the primary storage component 106 (e.g., from a cache memory component or other data store of the primary storage component 106).

It is to be appreciated and understood that, while, in some embodiments, the disclosed subject matter describes taking (e.g., capturing) a snapshot of a file stored in the primary storage component 106, the disclosed subject matter is not so limited, and, in accordance with various other embodiments, alternatively, the FMC 126 can take (e.g., generate or capture) or read a read-only copy (e.g., an ordinary unmodifiable read-only copy) of a file (e.g., file 320) stored in the primary storage component 106, and/or can lock out the file (e.g., file 320) after it is read and during the servicing of the client request so that no other user (e.g., another client), other client device (e.g., another client device associated with another client), or other component or device can access or modify the file until the client request for the file has been serviced by the FMC 126. The FMC 126 can utilize the read-only copy of the file or the file itself (e.g., when the file is locked out to others), instead of generating a snapshot of the file. If a read-only copy of the file is generated, the file ID component 134 can determine and generate a file ID for the read-only copy of the file based at least in part on the file data of the read-only copy and the defined hash function. The FMC 126 can determine whether the file ID of the read-only copy matches the file ID 308 of the requested file 304, and, if it does match, the FMC 126 can provide the read-only copy of the file to the client device 114 in response to the file request, instead of reading or recalling the file 304 from the secondary storage component 104. With regard to an instance where the local file 320 is locked out by the FMC 126 during servicing of the file request, the FMC 126 can determine whether the file ID of the local file 320 matches the file ID 308 of the requested file 304, and, if it does match, the FMC 126 can provide the file 320 to the client device 114 in response to the file request, instead of reading or recalling the file 304 from the secondary storage component 104.

The disclosed subject matter (e.g., the FMC 126 and other components described herein), employing the techniques described herein, can achieve a desirable cost savings with regard to processing resources, time resources, and/or financial cost resources by mitigating (e.g., reducing or minimizing) the number of reads or recalls of files from a secondary storage component (e.g., a cloud, archive, or external storage component). The disclosed subject matter (e.g., the FMC 126 and other components described herein), employing the techniques described herein, also can perform faster inline reading of files by mitigating (e.g., reducing or minimizing) undesirable (e.g., unnecessary) reads or recalls of files from the secondary storage component (e.g., by instead reading local copies of such files from the primary storage component). Further, the disclosed subject matter (e.g., the FMC 126 and other components described herein), employing the techniques described herein, can perform desirably faster reads or recalls of desired files by mitigating (e.g., reducing or minimizing) undesirable (e.g., unnecessary) reads or recalls of files from the secondary storage component, and instead reading local copies of such files from the primary storage component. Moreover, the disclosed subject matter (e.g., the FMC 126 and other components described herein), employing the techniques described herein, can mitigate (e.g., reduce or minimize) network traffic between the storage system and the secondary storage component (e.g., a cloud, archive, or external storage component) by mitigating (e.g., reducing or minimizing) undesirable (e.g., unnecessary) reads or recalls of files from the secondary storage component via a communication network, and instead reading local copies of such files from the primary storage component of the storage system.

Figure 4:
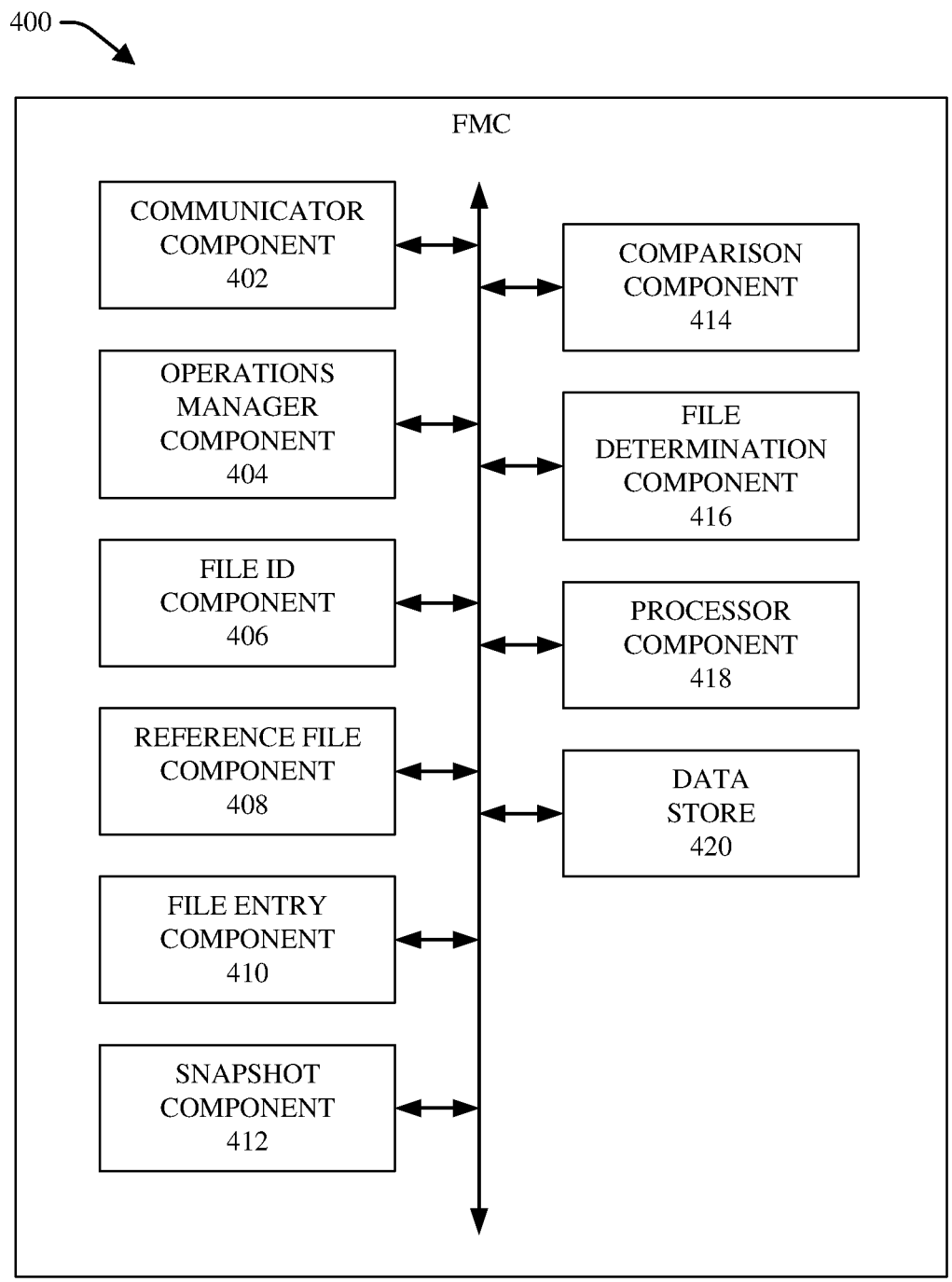
FIG. 4 depicts a block diagram of an example file manager component, in accordance with various aspects and embodiments of the disclosed subject matter.

Turning to FIG. 4 (along with FIG. 1), FIG. 4 depicts a block diagram of an example FMC 400, in accordance with various aspects and embodiments of the disclosed subject matter. The FMC 400 can comprise, for example, a communicator component 402, an operations manager component 404, a file ID component 406, a reference file component 408, a file entry component 410, a snapshot component 412, a comparison component 414, a file determination component 416, a processor component 418, and a data store 420.

The communicator component 402 can transmit information from the FMC 400 to another component(s) (e.g., secondary storage component), device(s) (e.g., client device), function(s), and/or user(s), and/or can receive information from the component(s), device(s), function(s), and/or user(s). For example, the communicator component 402 can receive a client request to read a file from a client device associated with a client, wherein the FMC 400 can process or service the request to read the file from the primary storage component of the storage system or a secondary storage component of or associated with the storage system, as more fully described herein. As another example, in response to a client request, the communicator component 402 can transmit information (e.g., a read file) responsive to the client request to the client device associated with the client request. As still another example, the communicator component 402 can transmit instructions to the secondary storage component to instruct the secondary storage component to read and/or provide a desired file, in response to a client request.

The operations manager component 404 can control (e.g., manage) operations associated with the FMC 400. For example, the operations manager component 404 can facilitate generating instructions to have components of the FMC 400 perform operations, and can communicate respective instructions to respective components (e.g., communicator component 402, file ID component 406, reference file component 408, file entry component 410, snapshot component 412, comparison component 414, file determination component 416, processor component 418, or data store 420) of the FMC 400 to facilitate performance of operations by the respective components of the FMC 400 based at least in part on the instructions, in accordance with the defined file management criteria and file management algorithm(s) (e.g., file management algorithms as disclosed, defined, recited, or indicated herein by the methods, systems, and techniques described herein). The operations manager component 404 also can facilitate controlling data flow between the respective components of the FMC 400 and controlling data flow between the FMC 400 and another component(s) or device(s) (e.g., secondary storage component, client device, . . . ) associated with (e.g., connected to) the FMC 400.

The file ID component 406 can determine and generate respective file IDs for respective files based at least in part on respective file data of the respective files and the defined hash function and/or associated defined hash algorithm, such as more fully described herein. For example, the file ID component 406 can determine and generate a first file ID for a first file based at least in part on first file data of the first file and the defined hash function, a second file ID for a second file based at least in part on second file data of the second file and the defined hash function, and so on. The files can comprise files that can be locally stored in the primary storage component or files that can be stored and archived in the secondary storage component. The defined hash algorithm can be a desired hash algorithm, such as any of the hash algorithms disclosed herein.

The reference file component 408 can generate, maintain, and update respective reference files (e.g., respective stub files) associated with respective files stored in the secondary storage component. Each of the respective reference files generated by the reference file component 408 can comprise data objects (e.g., secondary storage, cloud, or archive data objects), metadata objects (e.g., secondary storage, cloud, or archive metadata objects), cache data, or a file ID associated with the file, as more fully described herein. If a file has been modified, the reference file component 408 can update the data objects, metadata objects, cache data, and/or a file ID associated with the file, in accordance with the modification to the file. If only a portion of a file has been fetched from the secondary storage component and modified, the reference file component 408 can delete the file ID from the reference file associated with that file.

The file entry component 410 can generate, maintain, and update respective file entries comprising respective file entry information associated with respective files that are stored in the primary storage component, as more fully described herein. The respective file entry information associated with the respective files can comprise respective file IDs and respective file paths of the respective files stored in the primary storage component. If a file does not have a file entry, the file entry component 410 can generate a new file entry for that file, wherein the new file entry can comprise the file ID and file path associated with that file. If a file does have a file entry, the file entry component 410 can update the file entry for that file, for example, by updating the file ID and/or file path associated with that file. The file entry component 410 can maintain and manage the respective file entries of the respective files in the file entry data store. In some embodiments, the file entries can be stored in a table (e.g., FFT) in the file entry data store.

The snapshot component 412 can take (e.g., capture, generate, or create) a snapshot of a file or file path associated with a file (e.g., a local file stored in the primary storage component), as more fully described herein. The snapshot component 412 also can take a differential snapshot (e.g., differential snapshot copy) of the primary storage component (e.g., of the files and/or file directories stored in the primary storage component 106) to facilitate determining or identifying changes that have been made to files (e.g., modifications to existing files, creation and storage of new files) stored in the primary storage component of the storage system. In some embodiments, the FMC 400 can employ the file ID component 406 to determine and store file IDs associated with files (e.g., local files) stored in the primary storage component 106 using a job function, such as a lower priority job function, in accordance with the defined file management criteria. This can mitigate (e.g., reduce or minimize) the cost (e.g., resource costs, time costs, or financial costs) associated with determining and storing file IDs associated with files stored in the primary storage component.

The comparison component 414 can compare a file ID associated with an archived file stored in the secondary storage component with a file ID associated with a local file stored in the primary storage component and/or a file ID associated with a snapshot of the local file to facilitate determining whether a local file in the primary storage component is a copy (e.g., exact copy) of the archived file stored in the secondary storage component, and to facilitate determining whether there is a local file (e.g., copy of the archived file) that can be read and provided to a client device in response to a client request, instead of reading or recalling the archived file from the secondary storage component and providing that archived file to the client device in response to the client request. For instance, if, based at least in part on the result of a comparison of the file ID of an archived file and a file ID of a local file, the file determination component 416 determines that the file ID associated with the local file satisfies the defined match criterion with respect to the file ID associated with the archived file, the file determination component 416 can determine that further analysis is to be performed to determine whether the local file is a copy of the archived file. For instance, the file determination component 416 can determine that the snapshot component 412 is to take a snapshot of the local file, and the file ID component 406 is to generate a file ID of the snapshot.

The comparison component 414 can compare the file ID associated with the archived file with the file ID associated with the snapshot of the local file to facilitate determining whether the local file is a copy (e.g., exact copy) of the archived file stored in the secondary storage component. If, based at least in part on the result of the comparison of the file ID of the archived file and the file ID of the snapshot, the file determination component 416 determines that the file ID of the snapshot satisfies the defined match criterion with respect to the file ID of the archived file, the file determination component 416 can determine that the local file is a copy of the archived file, and the file determination component 416 can determine that the snapshot of the local file can be read and provided to the client device, in response to the client request, instead of reading or recalling the archived file from the secondary storage component and providing that archived file to the client device in response to the client request. If, instead, the comparison result indicates that the file ID of the snapshot does not match the file ID of the archived file, the file determination component 416 can determine that the local file is not a copy of the archived file, and the archived file is to be read or recalled from the secondary storage component and provided to the client device in response to the client request.

The processor component 418 can work in conjunction with the other components (e.g., communicator component 402, file ID component 406, reference file component 408, file entry component 410, snapshot component 412, comparison component 414, file determination component 416, or data store 420) to facilitate performing the various functions of the FMC 400. The processor component 418 can employ one or more processors, microprocessors, or controllers that can process data, such as information relating to files, file data, file systems, file IDs, reference files, file entries, file entry data store, snapshots, metadata, data objects, metadata objects, cache data, client requests, queries, parameters, traffic flows, policies, defined file management criteria, algorithms (e.g., file management algorithms), protocols, interfaces, tools, and/or other information, to facilitate operation of the FMC 400, as more fully disclosed herein, and control data flow between the FMC 400 and other components or devices (e.g., secondary storage component, client device, . . . ) associated with the FMC 400.

The data store 420 can store data structures (e.g., user data, metadata), code structure(s) (e.g., modules, objects, hashes, classes, procedures) or instructions, information relating to files, file data, file systems, file IDs, reference files, file entries, file entry data store, snapshots, metadata, data objects, metadata objects, cache data, client requests, queries, parameters, traffic flows, policies, defined file management criteria, algorithms (e.g., file management algorithms), protocols, interfaces, tools, and/or other information, to facilitate controlling operations associated with the FMC 400. In an aspect, the processor component 418 can be functionally coupled (e.g., through a memory bus) to the data store 420 in order to store and retrieve information desired to operate and/or confer functionality, at least in part, to the communicator component 402, file ID component 406, reference file component 408, file entry component 410, snapshot component 412, comparison component 414, file determination component 416, processor component 418, and data store 420, etc., and/or substantially any other operational aspects of the FMC 400.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 5-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 5:
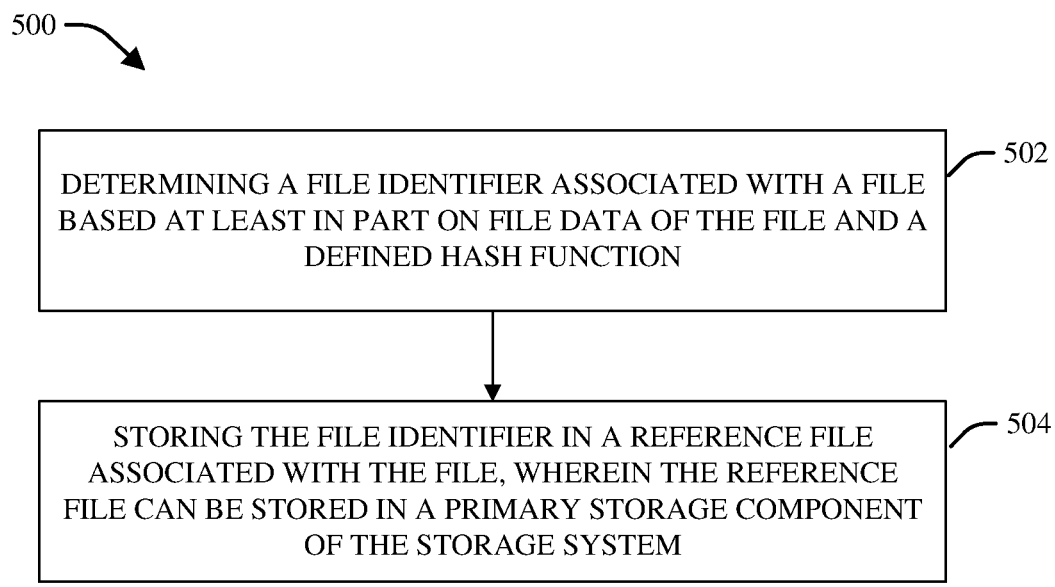
FIG. 5 illustrates a flow chart of an example method that can create and manage a file identifier associated with a file in a reference file to facilitate archival of the file in a secondary (e.g., archive) storage component of or associated with a storage system and/or desirable retrieval (e.g., reading) of the file or a local version of the file (if any) stored in a primary (e.g., local) storage component of the file system, in accordance with various aspects and embodiments of the disclosed subject matter.

FIG. 5 illustrates a flow chart of an example method 500 that can create and manage a file ID associated with a file in a reference file to facilitate archival of the file in a secondary (e.g., archive) storage component of or associated with a storage system and/or desirable retrieval (e.g., reading) of the file or a local version of the file (if any) stored in a primary (e.g., local) storage component of the file system, in accordance with various aspects and embodiments of the disclosed subject matter. The method 500 can be employed by, for example, a system comprising the FMC, a processor component (e.g., of or associated with the FMC), and/or data store (e.g., of or associated with the FMC and/or the processor component).

At 502, a file ID associated with a file can be determined based at least in part on file data of the file and a defined hash function. With regard to a file that is to be stored (e.g., archived) in a secondary (e.g., archive) storage component of or associated with the storage system, the FMC can determine the file ID (e.g., fingerprint or hash value) associated with the file based at least in part on the file data of the file and the defined hash function (e.g., based at least in part on applying the defined hash function to the file data). A defined hash algorithm can comprise the defined hash function, wherein the FMC can apply the defined hash algorithm and associated defined hash function to the file data to determine the file ID. In some embodiments, the FMC can store or facilitate storing the file in the secondary storage component (e.g., after determining or generating the file ID), which can be part of a cloud computing environment, wherein storing the file in the secondary storage component can archive the file in the cloud computing environment.

At 504, the file ID can be stored in a reference file associated with the file, wherein the reference file can be stored in a primary storage component of the storage system. The FMC can store the file ID in the reference file associated with the file in the primary (e.g., local) storage component. The file ID can be utilized to facilitate determining whether, during a subsequent read request to read the file (e.g., archived file) from the secondary storage component, a local version of the file (if any) stored on the primary storage component can be read from the primary storage component, instead of reading or recalling the file from the secondary storage component and incurring the costs (e.g., time costs, processing costs, and/or financial costs, . . . ) that can be associated with reading or recalling the file from the secondary storage component, as more fully described herein.

Figure 6:
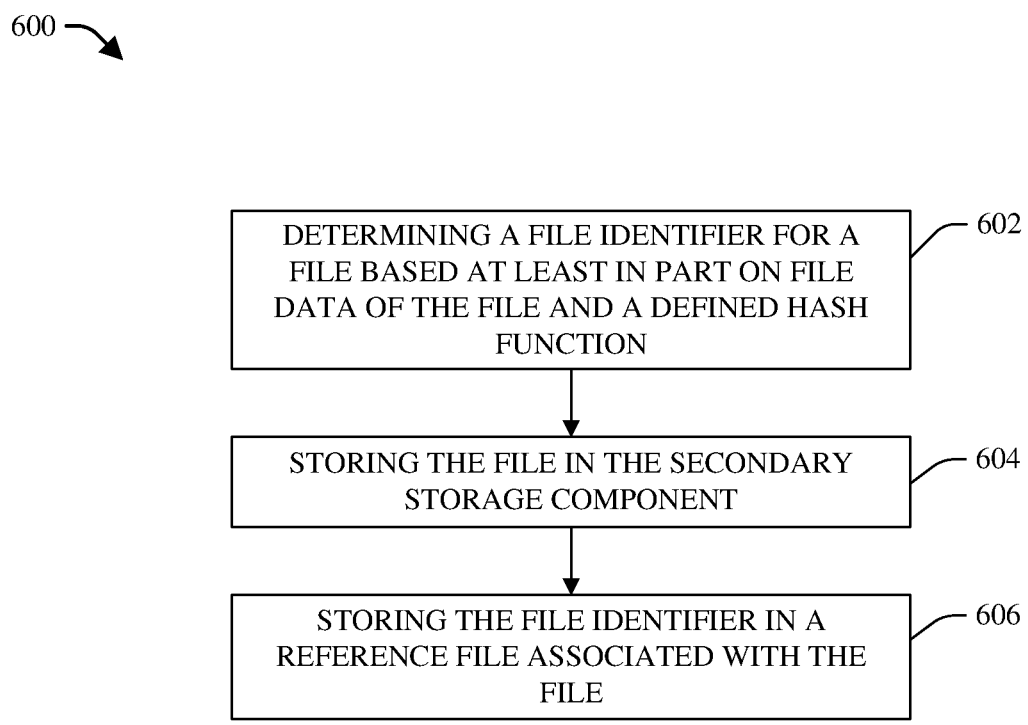
FIG. 6 presents a flow chart of an example method that can create and manage a file identifier associated with a new file in a reference file to facilitate archival of the new file in a secondary storage component, in accordance with various aspects and embodiments of the disclosed subject matter.

FIG. 6 presents a flow chart of an example method 600 that can create and manage a file ID associated with a new file in a reference file to facilitate archival of the new file in a secondary storage component, in accordance with various aspects and embodiments of the disclosed subject matter. The method 600 can be employed by, for example, a system comprising the FMC, a processor component (e.g., of or associated with the FMC), and/or data store (e.g., of or associated with the FMC and/or the processor component).

At 602, a file ID for a file can be determined based at least in part on file data of the file and a defined hash function. The FMC can determine (e.g., calculate) the file ID (e.g., file fingerprint or hash value) for the file (e.g., new file) based at least in part on the file data of the file and the defined hash function (e.g., based at least in part on applying the defined hash function to the file data). A defined hash algorithm can comprise the defined hash function, wherein the defined hash algorithm and associated defined hash function can be applied to the file data (e.g., by the FMC) to determine the file ID.

At 604, the file can be stored in the secondary storage component. The FMC can store (e.g., archive) the file in the secondary storage component. In some embodiments, the secondary storage component can be part of a cloud computing environment, wherein storing the file in the secondary storage component archives the file in the cloud computing environment.

At 606, the file ID can be stored in a reference file associated with the file. The FMC can generate the reference file (e.g., stub file), which can be associated with the file. The FMC can store the file ID in the reference file, which can be filed in a primary storage component of the storage system. The reference file (e.g., generated by the FMC) also can comprise secondary storage data objects (e.g., cloud or archive data objects), secondary storage metadata objects (e.g., cloud or archive metadata objects), and/or cache data, in addition to the file ID.

Figure 7:
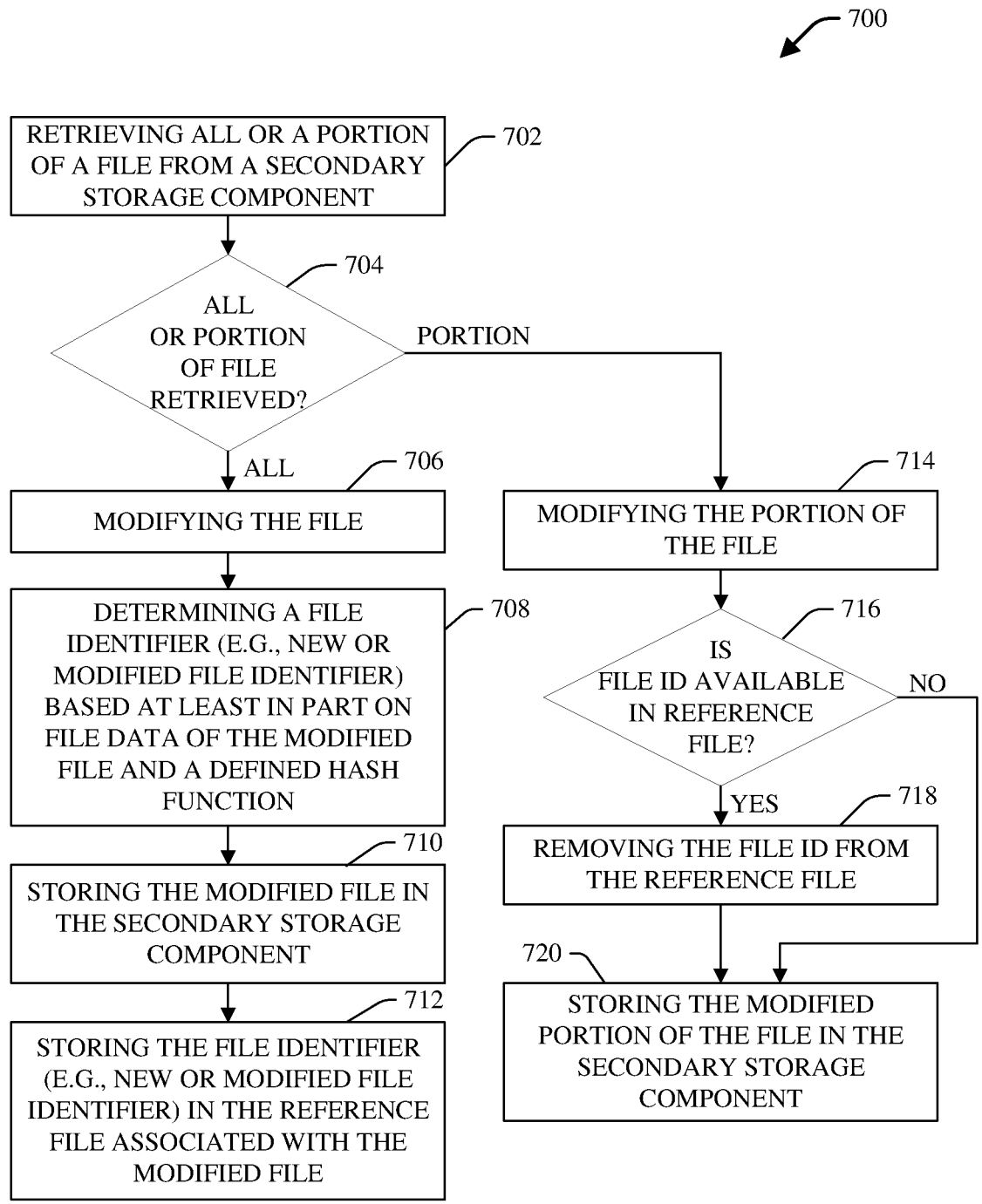
FIG. 7 illustrates a flow chart of an example method that can create and manage a file identifier associated with a modified file in or with respect to a reference file to facilitate archival of the modified file in a secondary storage component, in accordance with various aspects and embodiments of the disclosed subject matter.

FIG. 7 illustrates a flow chart of an example method 700 that can create and manage a file ID associated with a modified file in or with respect to a reference file to facilitate archival of the modified file in a secondary storage component, in accordance with various aspects and embodiments of the disclosed subject matter. The method 700 can be employed by, for example, a system comprising the FMC, a processor component (e.g., of or associated with the FMC), and/or data store (e.g., of or associated with the FMC and/or the processor component).

At 702, all or a portion of a file can be retrieved from a secondary storage component. The FMC can retrieve (e.g., fetch or read) or facilitate retrieval of all or a desired portion of the file from a secondary (e.g., cloud) storage component.

At 704, a determination can be made regarding whether all or the portion of the file was retrieved from the secondary storage component. The FMC can know, identify, and/or determine whether all or the portion of the file was retrieved from the secondary storage component.

At 706, with regard to the entire file being retrieved from the secondary storage component, the file can be modified, as desired. A write component or other component associated with the storage system can be employed to modify the file, for example, in response to user input information from a user. For example, a user can use a desired application to modify the file based at least in part on user input information received from the user.

At 708, a file ID (e.g., new or modified file ID) can be determined based at least in part on file data of the modified file and a defined hash function. The FMC can determine (e.g., calculate) the file ID (e.g., new or modified file fingerprint or hash value) for the modified file based at least in part on the file data of the modified file and the defined hash function (e.g., based at least in part on applying the defined hash function of a defined hash algorithm to the file data).

At 710, the modified file can be stored in the secondary storage component. For instance, the FMC can store (e.g., archive) the modified file in the secondary storage component.

At 712, the file ID (e.g., new or modified file ID) can be stored in the reference file associated with the modified file. The FMC can update the reference file (e.g., stub file) to store the file ID in the reference file, wherein the updated reference file can be filed in the primary storage component of the storage system. The reference file (e.g., generated by the FMC) also can comprise secondary storage data objects (e.g., cloud or archive data objects), secondary storage metadata objects (e.g., cloud or archive metadata objects), and/or cache data, in addition to the file ID, wherein the FMC also can update the secondary storage data objects, secondary storage metadata objects, and/or cache data based at least in part on the modification of the file.

Referring again to reference numeral 704, with regard to a portion of the file being retrieved from the secondary storage component (e.g., as determined, identified, or otherwise known by the FMC), at 714, the portion of the file can be modified, as desired. The write component or other component associated with the storage system can be employed to modify the portion of the file, for example, in response to user input information from a user.

At 716, a determination can be made regarding whether a file ID is available in the reference file associated with the file. The FMC can determine whether there is a file ID available (e.g., stored) in the reference file (e.g., stub file) associated with the file, a portion of which has been retrieved and modified.

In response to determining that the file ID is available in the reference file, at 718, the file ID can be removed from the reference file. For instance, in response to determining that the file ID is available in the reference file, the FMC can remove the file ID from the reference file, since the file ID is not suitable (e.g., not valid) with respect to the modified file, and a new file ID is not able to be determined for the modified file because only a portion of the file was retrieved from the secondary storage component.

At 720, the modified portion of the file can be stored in the secondary storage component. The FMC can store (e.g., archive) or facilitate storing the modified portion of the file in the secondary storage component. The modified portion of the file can be associated with the remainder of the file that was not retrieved and not modified.

Referring again to reference numeral 716, if it is determined that the file ID is not in the reference file, the method 700 can proceed to reference numeral 720, wherein the modified portion of the file can be stored in the secondary storage component. For instance, in response to determining that the file ID is not in the reference file, the FMC can store (e.g., archive) or facilitate storing the modified portion of the file in the secondary storage component.

Figure 8:
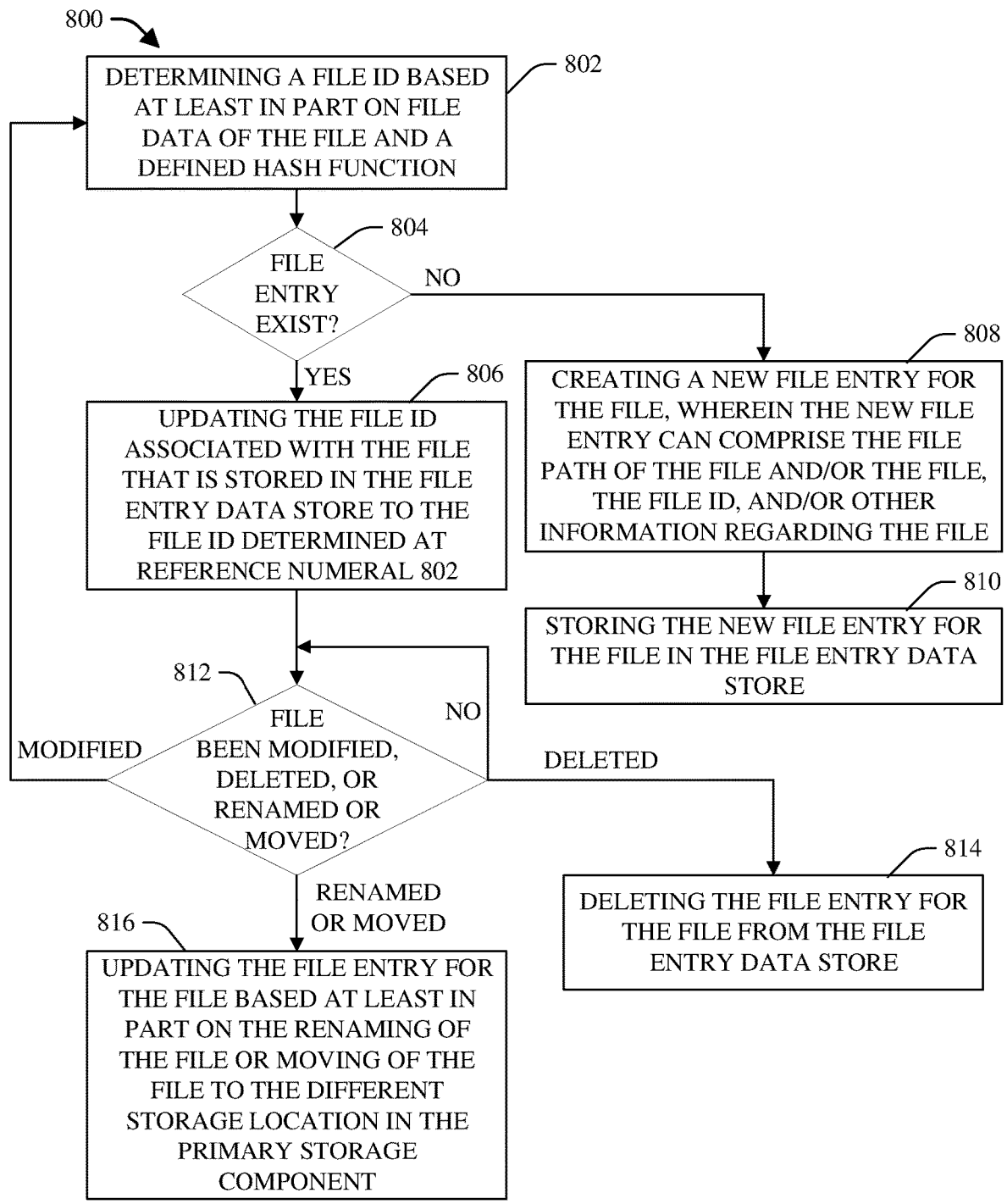
FIG. 8 depicts a flow chart of an example method that can create, store, and manage a file identifier associated with a file in a file entry data store to facilitate local storage of the file in a primary storage component, in accordance with various aspects and embodiments of the disclosed subject matter.

FIG. 8 depicts a flow chart of an example method 800 that can create, store, and manage a file ID associated with a file in a file entry data store (e.g., a table, such as an FFT, stored in the file entry data store) to facilitate local storage of the file in a primary (e.g., local) storage component, in accordance with various aspects and embodiments of the disclosed subject matter. The method 800 can be employed by, for example, a system comprising the FMC, a processor component (e.g., of or associated with the FMC), and/or data store (e.g., of or associated with the FMC and/or the processor component).

At 802, with regard to a file that is written (e.g. successfully written) and is to be stored in the primary storage component, a file ID can be determined based at least in part on file data of the file and a defined hash function. The FMC can determine (e.g., calculate) the file ID (e.g., file fingerprint or hash value) for the file based at least in part on the file data of the file and the defined hash function (e.g., based at least in part on applying the defined hash function of a defined hash algorithm to the file data).

At 804, a determination can be made regarding whether a file entry for the file exists in the file entry data store. The FMC can determine whether the file entry for the file exists in the file entry data store (e.g., a table, such as the FFT, stored in the file entry data store). For instance, the FMC can determine whether a file entry, comprising the file, the current file ID, and/or information regarding the file, exists in the file entry data store, which can indicate that the file is stored locally in the primary storage component. The information regarding the file can comprise information indicating the storage location and/or file path (e.g., path and location in the local directory) where the file is stored in the primary storage component.

In response to determining that a file entry for the file exists in the file entry data store, at 806, the file ID associated with the file that is stored in the file entry data store can be updated to the file ID determined at reference numeral 802. The FMC can determine whether there is a file entry associated with the file stored in the file entry data store, based at least in part on file information (e.g., file metadata) associated with the file. In response to determining that the file entry for the file exists in the file entry data store, the FMC can update the file ID that is currently stored in the file entry in the file entry data store to be the file ID (e.g., updated file ID) determined at reference numeral 802. At this point, the method can proceed from reference numeral 806 to reference numeral 812.

If, at 804, it is determined that a file entry for the file does not exist in the file entry data store, at 808, a new file entry for the file can be created, wherein the new file entry can comprise the file path of the file and/or the file, the file ID (e.g., file ID determined at reference numeral 802), and/or other information regarding the file. In response to determining that a file entry for the file does not exist in the file entry data store, the FMC can create the new file entry for the file. The file path can comprise the file and/or file path information that can indicate the file path to where the file is located in the directory and/or the storage location of the file in the primary storage component.

At 810, the new file entry for the file can be stored in the file entry data store. The FMC can store the new file entry for the file, comprising the file path and/or file, the file ID (e.g., file ID determined at reference numeral 802), and/or other information regarding the file, in the file entry data store (e.g., the FFT in the file entry data store). At this point, the method can proceed to reference numeral 812.

At 812, a determination can be made regarding whether the file has been modified (e.g., data of file has been modified), deleted, or renamed or moved. The FMC can track the file and can determine whether the file has been modified (e.g., whether a write operation has been performed to modify the data of the file), deleted, or renamed or moved to a different storage location in the primary storage component.

If, at 812, it is determined that the file has been modified, the method 800 can return to reference numeral 802, wherein the method 800 can proceed from that point to determine a new file ID for the modified file based at least in part on the modified file data of the modified file and the defined hash function. For instance, in response to determining that the file has been modified, the FMC can determine the new file ID for the modified file based at least in part on the modified file data of the modified file and the defined hash function. The method 800 can proceed from that point.

If, at reference numeral 812, it is determined that the file has been deleted, at 814, the file entry for the file can be deleted from the file entry data store. In response to determining that the file has been deleted, the FMC can delete the file entry for the file from the table (e.g., FFT) stored in the file entry data store.

If, at reference numeral 812, it is determined that the file has been renamed or moved to a different storage location in the primary storage component, at 816, the file entry for the file can be updated based at least in part on the renaming of the file or moving of the file to the different storage location in the primary storage component. In response to determining that the file has been renamed or moved, the FMC can update the file entry for the file based at least in part on the renaming of the file or moving of the file to the different storage location in the primary storage component, wherein the FMC can store the updated file entry in the table stored in the file entry data store. For example, if the file has been moved to a different storage location in the primary storage component, the FMC can determine the new (e.g., different) storage location and/or file path (e.g., in the file directory) of the file in the primary storage component, and can update the information relating to the storage location and/or file path associated with the file that is stored in the file entry to reflect the new storage location and/or file path of the file in the primary storage component.

If, at reference numeral 812, it is determined that there has been no modification made to the file, the file has not been deleted, and the file has not been renamed or moved, the method 800 can proceed back to reference numeral 812 to continue to track the file and determine whether the file has been modified, deleted, or renamed or moved. If no modification of the file, deletion of the file, renaming of the file, or moving of the file, has been detected by the FMC, the FMC can continue to track the file to detect or determine whether the file has been modified, deleted, or renamed or moved (e.g., moved to a different storage location in the primary storage component).

Figure 9:
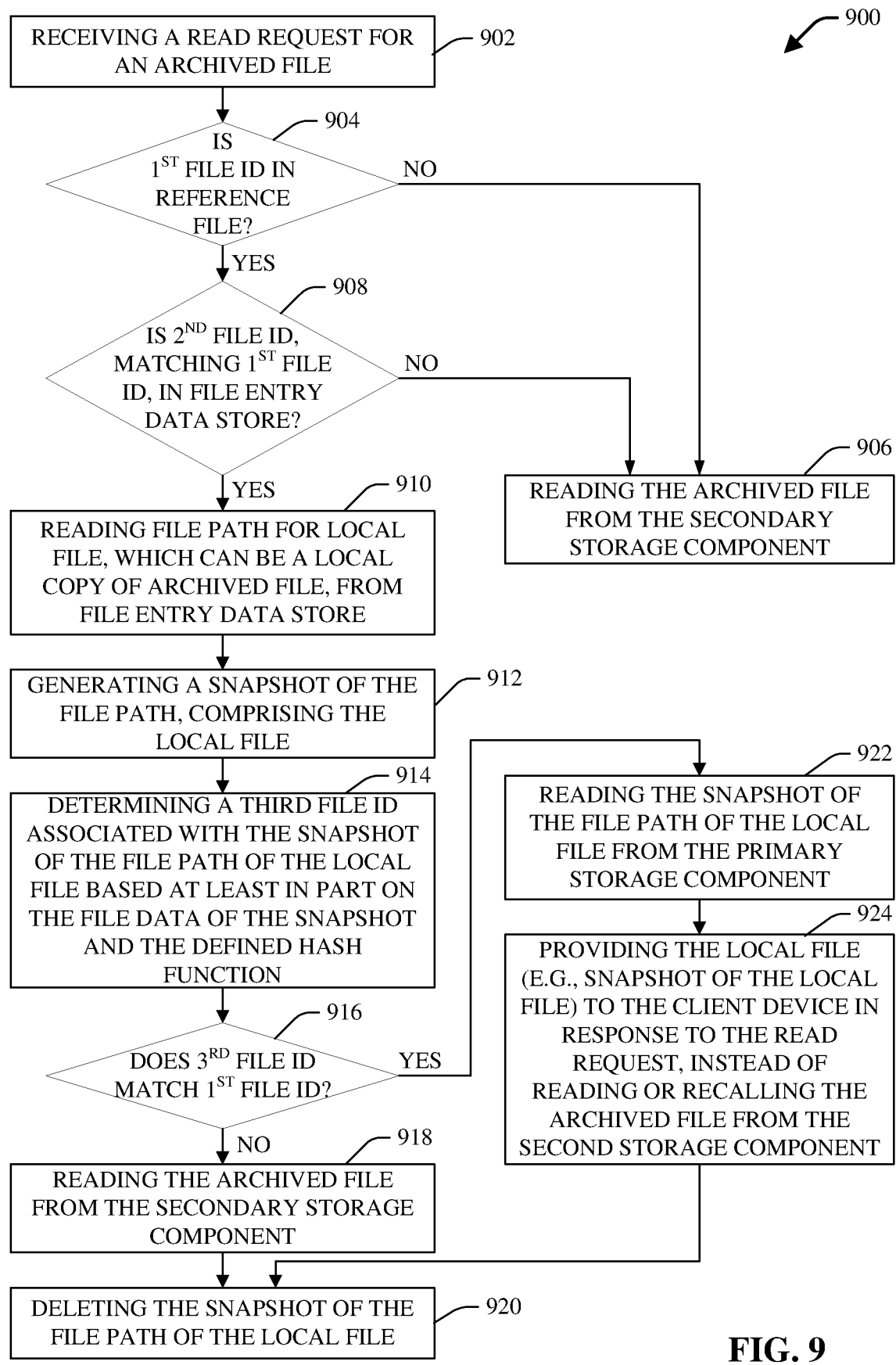
FIG. 9 illustrates a flow chart of an example method that can retrieve a file that has been archived without having to access a secondary storage component and download the file from the secondary storage component, in accordance with various aspects and embodiments of the disclosed subject matter.

FIG. 9 illustrates a flow chart of an example method 900 that can retrieve a file that has been archived without having to access a secondary storage component and download the file from the secondary storage component, in accordance with various aspects and embodiments of the disclosed subject matter. The method 900 can be employed by, for example, a system comprising the FMC, a processor component (e.g., of or associated with the FMC), and/or data store (e.g., of or associated with the FMC and/or the processor component).

At 902, a read request for an archived file can be received. A user, an application, a component or device, or another entity can communicate the read request for the archived file to the storage system. The FMC can receive the read request for the archived file. For example, a user can select (e.g., click or double click on) an icon associated with the archived file via a user interface on a device (e.g., communication device, such as a computer, smart phone, or electronic tablet or pad, . . . ). In response to the selecting of the icon, a read request for the archived file can be generated and communicated to the storage system, and the FMC can receive the read request. The archived file can be located in a secondary storage component of or associated with the storage system. In some embodiments, the secondary (e.g., cloud) storage component can be located in the cloud (e.g., in a cloud computing environment).

At 904, a determination can be made regarding whether a first file ID associated with the archived file is available in the reference file associated with the archived file. The FMC can search the directory of the primary storage component of the storage system to determine whether there is a reference file (e.g., stub file) associated with the archived file stored in the primary storage component. If the FMC identifies a reference file associated with the archived file in the primary storage component, the FMC can search the reference file to determine whether the reference file contains the first file ID (e.g., first fingerprint or first hash value) associated with the archived file.

In response to determining that there is no first file ID in the reference file, at 906, the archived file can be read from the secondary storage component. In response to determining that there is no first file ID in the reference file (or no reference file, and thus, no first file ID), the FMC can determine that there is no copy (e.g., local copy) of the archived file stored in the primary storage component (or at least no copy of the archived file is identified as being stored in the primary storage component), and the FMC can read or recall (e.g., download), or facilitate the reading or recalling of, the archived file from the secondary storage component.

If, at reference numeral 904, it is determined that the first file ID associated with the archived file is stored in the reference file, at 908, a determination can be made regarding whether a second file ID associated with a local file, and satisfying a defined match criterion with respect to the first file ID, is in the file entry data store. In response to determining that the first file ID is stored in the reference file, the FMC can determine whether a second file ID (e.g., second fingerprint or second hash value) associated with a local file, and satisfying the defined match criterion with respect to the first file ID, is stored in the file entry data store, wherein the local file can be stored in the primary storage component of the storage system.

In response to determining that there is no second file ID stored in the file entry data store that satisfies the defined match criterion with respect to the first file ID, the method 900 can return to reference numeral 906, wherein the archived file can be read from the secondary storage component. The FMC can analyze (e.g., compare) the first file ID and one or more file IDs stored in one or more file entries stored in the file entry data store to determine whether there is a second file ID associated with a local file stored in a file entry (e.g., associated with the local file) in the file entry data store that satisfies the defined match criterion with respect to the first file ID (e.g., determine whether there is a second file ID that matches, or at least sufficiently matches, the first file ID), wherein the defined match criterion can indicate or specify the conditions under which file IDs can be determined to match each other. Based at least in part on the results of such analysis, if the FMC determines that there is no second file ID stored in the file entry data store that satisfies the defined match criterion with respect to the first file ID, the FMC can determine that there is no copy (e.g., local copy) of the archived file stored in the primary storage component (or at least no copy of the archived file is identified as being stored in the primary storage component), and the FMC can read or recall, or facilitate the reading or recalling of, the archived file from the secondary storage component.

If, at reference numeral 908, it is determined that there is a second file ID stored in the file entry data store that satisfies the defined match criterion with respect to the first file ID, at 910, the file path for a local file, which can be a local copy of the archived file, can be read from the file entry data store. In response to determining that there is a second file ID stored in the file entry data store that matches the first file ID, the FMC can identify or determine the file path associated with the second file ID from the file entry associated with the local file and stored in the file entry data store, and the FMC can read the file path for the local file from the file entry.

At 912, a snapshot of the file path, comprising the local file, can be generated. The FMC can generate (e.g., create, capture, or take) the snapshot of the file path of the local file, which can comprise the local file and the file path to location in the file directory and/or the storage location where the local file is stored in the primary storage component. The snapshot of the file path can be or can comprise a non-modifiable version of the local file.

At 914, a third file ID associated with the snapshot of the file path of the local file can be determined based at least in part on the file data of the snapshot and the defined hash function. The FMC can determine the third file ID (e.g., third fingerprint or third hash value) associated with the snapshot of the file path of the local file based at least in part on the file data of the snapshot and the defined hash function (e.g., the defined hash algorithm and associated defined hash function).

At 916, a determination can be made regarding whether the third file ID associated with the snapshot of the file path of the local file and the first file ID associated with the archived file satisfy the defined match criterion. For instance, the FMC can compare the third file ID to the first file ID to determine whether the third file ID and the first file ID satisfy the defined match criterion (e.g., determine whether the third file ID matches, or at least sufficiently matches, the first file ID). Based at least in part on the results of such comparison, the FMC can determine whether the third file ID associated with the snapshot of the file path of the local file and the first file ID associated with the archived file satisfy the defined match criterion.

In response to determining that the third file ID and the first file ID do not satisfy the defined match criterion, at 918, the archived file can be read from the secondary storage component. For instance, if the FMC determines that the third file ID and the first file ID do not satisfy the defined match criterion, the FMC can determine that there is no copy (e.g., local copy) of the archived file stored in the primary storage component (or at least no copy of the archived file is identified as being stored in the primary storage component), and the FMC can read or recall the archived file from the secondary storage component.

At 920, the snapshot of the file path of the local file can be deleted. For instance, the FMC can delete the snapshot of the file path of the local file from the primary storage component (e.g., from the cache memory or other data store of the file system of the primary storage component).

If, at reference numeral 916, it is determined that the third file ID and the first file ID satisfy the defined match criterion, at 922, the snapshot of the file path of the local file can be read from the primary storage component. In response to determining that the third file ID and the first file ID satisfy the defined match criterion, the FMC can determine that the local file of the snapshot desirably (e.g., suitably or acceptably) matches the archived file, and the FMC can read, or facilitate the reading of, the snapshot of the file path of the local file from the primary storage component (e.g., from the cache memory or other data store of the file system of the primary storage component).

At 924, the local file (e.g., snapshot of the local file), which was read from the primary storage component, can be provided to the client device in response to the read request, instead of reading or recalling the archived file from the second storage component. The FMC can provide (e.g., communicate or facilitate communicating) the local file (e.g., the snapshot of the local file), which was read from the primary storage component, to the client device in response to the read request, instead of reading or recalling the archived file from the second storage component.

At this point, the method 900 can proceed to reference numeral 920, wherein the snapshot of the file path of the local file can be deleted. For instance, after reading the snapshot from the primary storage component, the FMC can delete the snapshot of the file path of the local file from the primary storage component.

Figure 10:
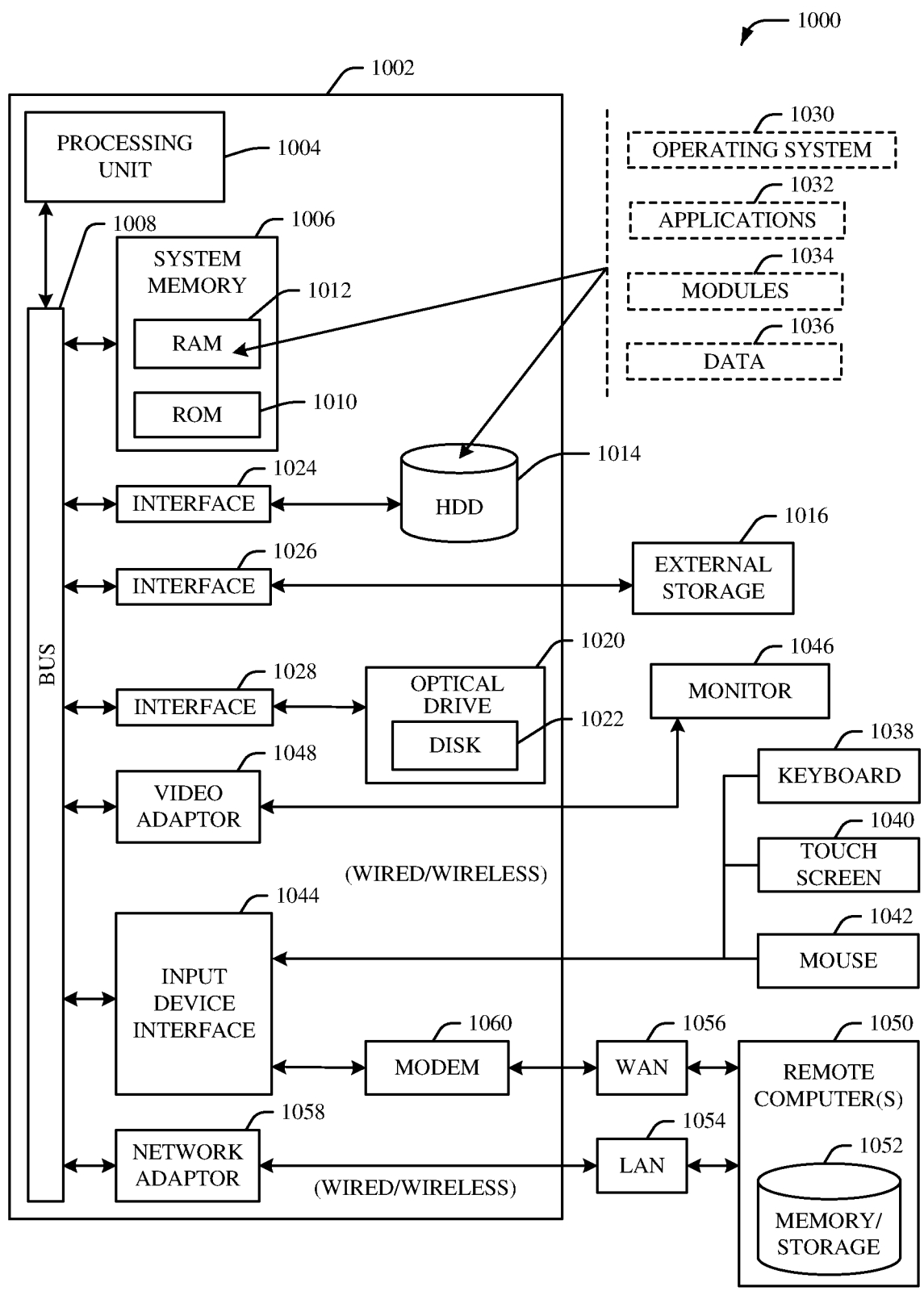
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., storage system, connection manager component, node, update component, client device, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, a first file identifier associated with a first file based at least in part on file data of the first file and a defined hash function;
   storing, by the system, the first file identifier in a reference file associated with the first file, wherein the reference file is stored in a primary data store;
   storing, by the system, the first file in an archive data store that is remote from the primary data store; and
   in response to a request for the first file stored in the archive data store, the request being received by a file manager associated with the primary data store, determining, by the system, whether a copy of the first file is stored in the primary data store based at least in part on a first result of a first determination of whether a second file identifier associated with a second file exists in the primary data store and satisfies a defined match criterion with respect to the first file identifier associated with the first file, and based at least in part on a second result of a second determination of whether a third file identifier associated with a snapshot copy relating to the second file satisfies the defined match criterion with respect to the first file identifier associated with the first file, to mitigate a cost associated with retrieving the first file from the archive data store, wherein the snapshot copy and the third file identifier are generated in response to the request, and wherein the first result and the second result indicate whether the second file is the copy of the first file stored in the primary data store.

2. The method of claim 1, further comprising:
retrieving, by the system, the first file from the archive data store;
modifying, by the system, the first file to generate a modified file comprising modified file data;
determining, by the system, a modified file identifier associated with the modified file based at least in part on the modified file data of the modified file and the defined hash function;
storing, by the system, the modified file in the archive data store; and
updating, by the system, the reference file to replace the first file identifier in the reference file with the modified file identifier.

3. The method of claim 1, further comprising:
retrieving, by the system, a portion of the first file from the archive data store;
modifying, by the system, the portion of the first file to generate a modified portion of the first file;
determining, by the system, whether the first file identifier associated with the first file is in the reference file;
in response to determining that the first file identifier is in the reference file, removing, by the system, the first file identifier from the reference file; and
storing, by the system, the modified portion of the first file in the archive data store.

4. The method of claim 1, wherein the file data is first file data, and wherein the method further comprises:
determining, by the system, the second file identifier associated with the second file based at least in part on second file data of the second file and the defined hash function, wherein the second file is stored in the primary data store, wherein the second file is the copy of the first file and the second file data is same as the first file data, and wherein the second file identifier is same as the first file identifier.

5. The method of claim 4, further comprising:
in response to a write operation performed on the second file:
determining, by the system, whether file path data associated with the second file exists in a file entry data store;
in response to determining that no file path data associated with the second file exists in the file entry data store, creating, by the system, a file entry comprising the second file identifier and file path data associated with the second file, wherein the file path data indicates a storage location of the second file in the primary data store; and
storing, by the system, the file entry in the file entry data store.

6. The method of claim 4, further comprising:
in response to a write operation performed on the second file:
determining, by the system, whether file path data associated with the second file exists in a file entry data store;
in response to determining that the file path data associated with the second file exists in the file entry data store, updating, by the system, a file entry associated with the second file to generate an updated file entry, wherein the updating of the file entry comprises updating a previous file identifier to the second file identifier to facilitate the generating of the updated file entry; and
storing, by the system, the updated file entry in the file entry data store.

7. The method of claim 4, further comprising:
deleting, by the system, the second file from the primary data store; and
in response to the deleting of the second file, deleting, by the system, the file entry from the file entry data store.

8. The method of claim 4, wherein the storage location is a first storage location, and wherein the method further comprises:
determining, by the system, that a first name of the second file has been modified to a second name, or a first storage location in the primary data store for the second file has been changed to a second storage location in the primary data store; and
updating, by the system, the file entry to generate a modified file entry, comprising modified path data, that is stored in the file entry data store, wherein the modified file path data comprises or indicates the second name of the second file or the second storage location of the second file in the primary data store.

9. The method of claim 4, further comprising:
in response to a read request for the first file stored in the archive data store, determining, by the system, whether the first file identifier is in the reference file;
in response to determining that the first file identifier is in the reference file, determining, by the system, whether the second file identifier matching the first file identifier is in a file entry in a file entry data store; and
one of:
in response to determining that the second file identifier is in the file entry in the file entry data store, reading, by the system, file path data associated with the second file from the file entry data store; or
in response to determining that the second file identifier is not in the file entry in the file entry data store, reading, by the system, the first file from the archive data store.

10. The method of claim 9, further comprising:
generating, by the system, the snapshot copy of the file path data associated with the second file, wherein the file path data comprises the second file;
determining, by the system, the third file identifier associated with the snapshot copy based at least in part on the snapshot file data of the snapshot copy and the defined hash function, wherein the snapshot file data is same as the second file data of the second file;
determining, by the system, whether the third file identifier satisfies the defined match criterion with respect to the first file identifier; and
one of:
in response to determining that the third file identifier satisfies the defined match criterion with respect to the first file identifier, reading, by the system, the snapshot copy associated with the second file from the primary data store instead of reading the first file from the archive data store; or
in response to determining that the third file identifier does not satisfy the defined match criterion with respect to the first file identifier, reading, by the system, the first file from the archive data store.

11. The method of claim 4, further comprising:
generating, by the system, a differential snapshot copy of files associated with the primary data store;
comparing, by the system, the differential snapshot copy with a previous differential snapshot copy of files associated with the primary data store;
determining, by the system, at least one modification associated with the primary data store based at least in part on a comparison result of the comparing; and
at least one of creating or updating, by the system, at least one file entry of a file entry data store based at least in part on the at least one modification, wherein the at least one modification relates to at least the second file, and wherein the at least one file entry comprises a file entry that includes the second file identifier and file path data associated with the second file.

12. A system, comprising:
a memory that stores computer executable components; and
a processor that executes computer executable components stored in the memory, wherein the computer executable components comprise:
a file manager component that generates a first file identifier associated with a first file based at least in part on file information of the first file and a defined hash function, and stores the first file identifier in a reference file associated with the first file, wherein the reference file is stored in a primary storage component of a storage system; and
a storage manager component that stores the first file in a secondary storage component that is external to the storage system,
wherein, in response to a request for the first file stored in the secondary storage component, the request being received by the file manager component associated with the primary storage component, the file manager component determines whether a copy of the first file is stored on the primary storage component based at least in part on a first result of a first determination of whether a second file identifier associated with a second file exists in the primary storage component and satisfies a defined match criterion with respect to the first file identifier associated with the first file, and based at least in part on a second result of a second determination of whether a third file identifier associated with an unmodifiable file copy associated with the second file satisfies the defined match criterion with respect to the first file identifier associated with the first file, to mitigate a cost associated with retrieving the first file from the secondary storage component, wherein the unmodifiable file copy associated with the second file and the third file identifier are generated in response to the request, and wherein the first result and the second result indicate whether the second file is the copy of the first file stored in the primary storage component.

13. The system of claim 12, wherein the first file is received from the secondary storage component, wherein the first file is modified to generate a modified file comprising modified file information, and wherein the file manager component generates a modified file identifier associated with the modified file based at least in part on the modified file information of the modified file and the defined hash function, facilitates storing the modified file in the secondary storage component, and modifies the reference file to replace the first file identifier in the reference file with the modified file identifier.

14. The system of claim 12, wherein the file information is first file information, wherein the file manager component generates the second file identifier associated with the second file based at least in part on second file information of the second file and the defined hash function, wherein the second file is stored in the primary storage component, wherein the second file is the copy of the first file and the second file information is same as the first file information, wherein the second file identifier is same as the first file identifier, and wherein the first file identifier is a first hash value and the second file identifier is a second hash value.

15. The system of claim 14, wherein, in response to a write operation performed on the second file, the file manager component determines whether file path information associated with the second file exists in a file entry data store, and
one of:
in response to determining that no file path information associated with the second file exists in the file entry data store, the file manager component generates a file entry comprising the second file identifier and the file path information associated with the second file, and stores the file entry in the file entry data store, wherein the file path information indicates a storage location of the second file in the primary storage component, or
in response to determining that the file path information associated with the second file exists in the file entry data store, the file manager component updates a previous file entry to generate the file entry comprising the second file identifier associated with the second file, and stores the file entry in the file entry data store.

16. The system of claim 14, wherein, in response to a read request for the first file stored in the secondary storage component, the file manager component determines whether the first file identifier is in the reference file,
wherein, if it is determined that the first file identifier is in the reference file, the file manager component determines whether the second file identifier is in a file entry in a file entry data store,
wherein, if it is determined that the second file identifier is in the file entry in the file entry data store, the file manager component reads file path information associated with the second file from the file entry of the file entry data store, and
wherein, if it is determined that the second file identifier is not in the file entry in the file entry data store, the file manager component reads the first file from the secondary storage component.

17. The system of claim 16, wherein, in response to determining that the second file identifier is in the file entry and reading the file path information associated with the second file from the file entry, the file manager component generates the unmodifiable file copy of the file path information associated with the second file, wherein the file path information comprises the second file information of the second file,
wherein the file manager component determines the third file identifier associated with the unmodifiable file copy based at least in part on the unmodifiable file information of the unmodifiable file copy and the defined hash function, wherein the unmodifiable file information is same as the second file information of the second file, and wherein the file manager component determines whether the third file identifier satisfies the defined match criterion with respect to the first file identifier.

18. The system of claim 17, wherein, in response to determining that the third file identifier satisfies the defined match criterion with respect to the first file identifier, the file manager component reads the unmodifiable file copy associated with the second file from the primary storage component instead of reading the first file from the secondary storage component; or in response to determining that the third file identifier does not satisfy the defined match criterion with respect to the first file identifier, the file manager component reads the first file from the secondary storage component.

19. A non-transitory machine-readable storage medium, comprising executable instructions that, when executed by a processor, facilitate performance of operations, comprising:

determining a first hash value associated with a first file based at least in part on file data of the first file and a defined hash function;

storing the first hash value in a stub file associated with the first file, wherein the stub file is stored in a primary data store;

storing the first file in a secondary data store that is remote from the primary data store; and in response to a request for the first file stored in the secondary data store, the request being received by a file manager associated with the primary data store, determining whether a copy of the first file is stored in the primary data store based at least in part on a first result of a first determination of whether a second hash value associated with a second file exists in the primary data store and matches the first hash value associated with the first file, and based at least in part on a second result of a second determination of whether a third hash value associated with an unmodifiable version of the second file matches the first hash value associated with the first file, to mitigate a cost associated with obtaining the first file from the secondary data store, wherein the third hash value and the unmodifiable version of the second file are generated in response to the request, and wherein the first result and the second result indicate whether the second file is the copy of the first file stored in the primary data store.

20. The non-transitory machine-readable storage medium of claim 19, wherein the copy of the first file is the second file that is same as the first file, and wherein the operations further comprise:

determining whether the second hash value associated with the second file exists in a tertiary data store associated with the primary data store; and determining whether to read the unmodifiable version of the second file from the primary data store or read the first file from the secondary data store based at least in part on a third result of the determining whether the second hash value exists in the tertiary data store, and, if it is determined that the second hash value exists in the tertiary data store, based at least in part on a fourth result of determining whether the second hash value matches the first hash value.

* * * * *